US 12,017,258 B1

United States Patent
Durnell

(10) Patent No.: US 12,017,258 B1
(45) Date of Patent: Jun. 25, 2024

(54) POOL FILTER CLEANING SYSTEM AND RELATED METHOD

(71) Applicant: Michael Durnell, Escondido, CA (US)

(72) Inventor: Michael Durnell, Escondido, CA (US)

(*) Notice: Subject to any disclaimer, the term of this patent is extended or adjusted under 35 U.S.C. 154(b) by 0 days.

(21) Appl. No.: 18/417,880

(22) Filed: Jan. 19, 2024

Related U.S. Application Data

(60) Provisional application No. 63/467,254, filed on May 17, 2023.

(51) Int. Cl.
*B08B 3/14* (2006.01)
*B01D 39/20* (2006.01)
*B01D 41/04* (2006.01)
*B08B 13/00* (2006.01)

(52) U.S. Cl.
CPC ............ *B08B 3/14* (2013.01); *B01D 39/2068* (2013.01); *B01D 41/04* (2013.01); *B08B 13/00* (2013.01)

(58) Field of Classification Search
CPC ....... B08B 3/14; B08B 13/00; B01D 39/2068; B01D 41/04
USPC ......................................................... 134/109
See application file for complete search history.

(56) References Cited

U.S. PATENT DOCUMENTS

| 3,608,567 A * | 9/1971 | Neill, Jr. ................. B01D 46/79 134/152 |
| 3,864,262 A * | 2/1975 | Lang ....................... E04H 4/1209 210/167.14 |
| 2022/0370932 A1 | 11/2022 | Thiessen et al. |

* cited by examiner

*Primary Examiner* — Tinsae B Ayalew
(74) *Attorney, Agent, or Firm* — CP LAW GROUP PC; Cy Bates

(57) ABSTRACT

A pool filter cleaning system is disclosed. The pool filter system allows for an efficient cleaning of contaminated pool filters without disposing contaminants into the ground or drain while also preserving water used. The system includes a container body having an interior volume divided into an upper wash compartment and a lower catch chamber. A system filter is disposed between the upper wash compartment and the lower catch chamber. A cleaning platform is disposed above the system filter and is configured to support a contaminated pool filter. The system further includes one or more pressure differential ports disposed on the container body. The one or more pressure differential ports are configured to receive a corresponding pressure generator apparatus for creating a pressure differential between the upper wash compartment and the lower catch chamber.

17 Claims, 18 Drawing Sheets

POOL FILTER CLEANING SYSTEM AND RELATED METHOD

CROSS-REFERENCE TO RELATED APPLICATIONS

This application claims benefit of priority with U.S. Provisional Application Ser. No. 63/467,254, filed May 13, 2023; the entire contents of which are hereby incorporated by reference.

BACKGROUND

Field of the Invention

This disclosure relates to a filter cleaning system, and more particularly to an all-in-one filter cleaning system configured to more efficiently clean contaminated filters.

Description of the Related Art

Maintenance of residential and commercial pools requires periodic cleaning of pool filter systems. The pool filter system is configured to remove all contaminants, including dirt and debris, that enters swimming pools. These contaminants are collected within the pool filter system and must be cleaned periodically for the pool filter system to function properly.

Conventionally, contaminated filters are cleaned by simply spraying with a hose, causing dirty water, or contaminated water, to go into the ground or the storm drain. Even if the contaminated water is somehow collected, the contaminated water is often disposed down the storm drain which can have negative environmental effects and can be against local laws and regulations.

Furthermore, cleaning contaminated filters is generally an inefficient process requiring wasted time in setting up, cleaning, and taking down. Some improvements have been introduced including a pool filter cleaning system disclosed by Thiessen et al., in publication 2022/0370932. Thiessen discloses a system for more efficiently cleaning pool filters. However, although Thiessen does capture some of the water, it inevitably allows much to fall onto the ground and into the storm drain.

There is an ongoing need for a pool filter cleaning system that prevents contaminants into the ground or storm drain while also providing an efficient means of cleaning.

SUMMARY

A pool filter cleaning system is disclosed. The pool filter system allows for an efficient cleaning of contaminated pool filters without disposing contaminants into the ground or drain while also preserving water used. The system includes a container body having an interior volume divided into an upper wash compartment and a lower catch chamber. A system filter is disposed between the upper wash compartment and the lower catch chamber. A cleaning platform is disposed above the system filter and is configured to support a contaminated pool filter. The system further includes one or more pressure differential ports disposed on the container body. The one or more pressure differential ports are configured to receive a corresponding pressure generator apparatus for creating a pressure differential between the upper wash compartment and the lower catch chamber.

The pool filter cleaning system allows for an efficient and eco-friendly way of cleaning pool filters that require regular maintenance. Water used in the system and method can be returned to the pool and can safely go down a storm drain. All removed contaminants can be properly disposed of instead of going into the ground or the storm drain.

BRIEF DESCRIPTION OF THE DRAWINGS

Other features, combinations, and embodiments will be appreciated by one having the ordinary level of skill in the art upon a thorough review of the following details and descriptions, particularly when reviewed in conjunction with the drawings, wherein.

DETAILED DESCRIPTION

Figure 1:
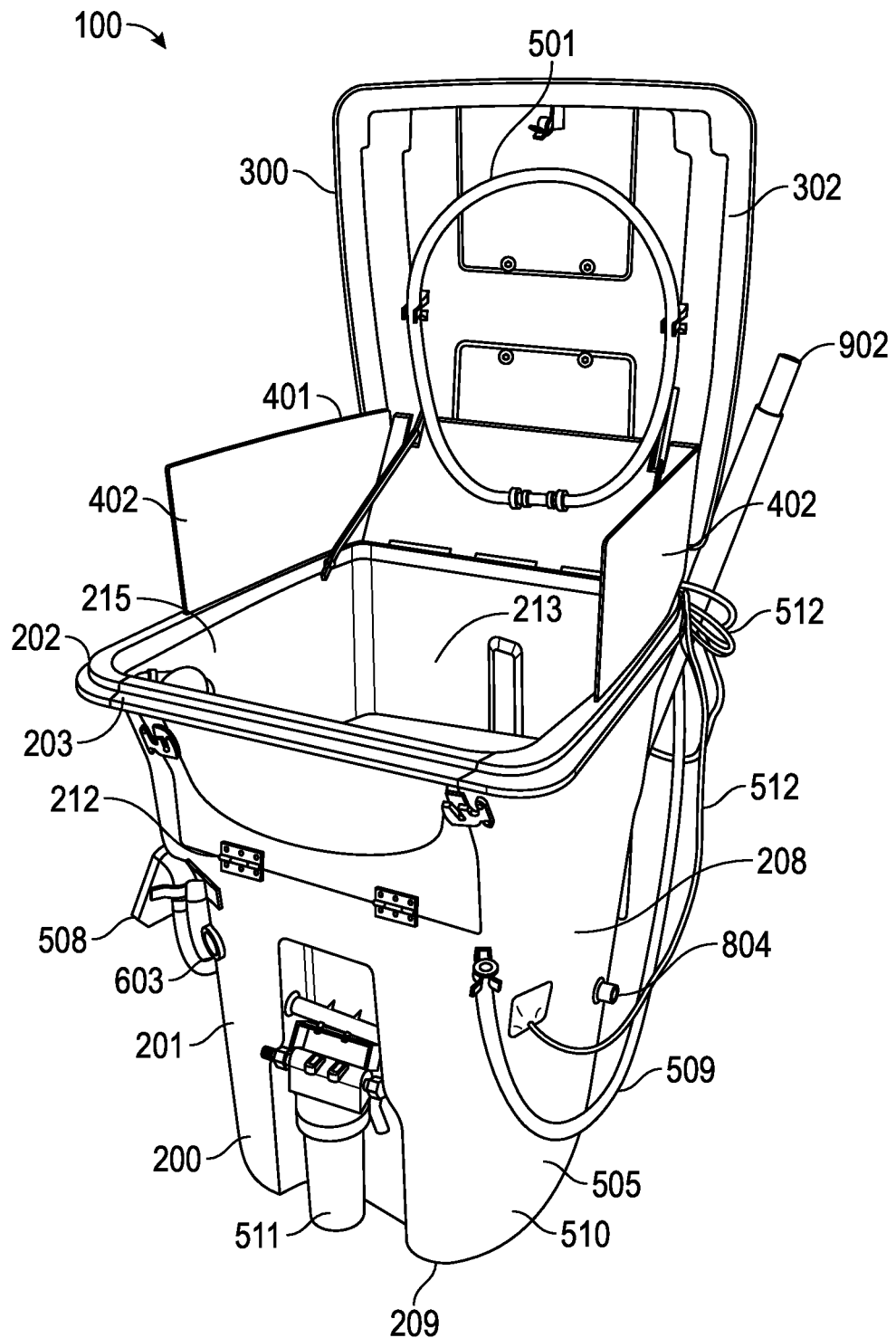
FIG. 1 shows a perspective view of a pool filter cleaning system in accordance with a first illustrated embodiment.
Figure 2:
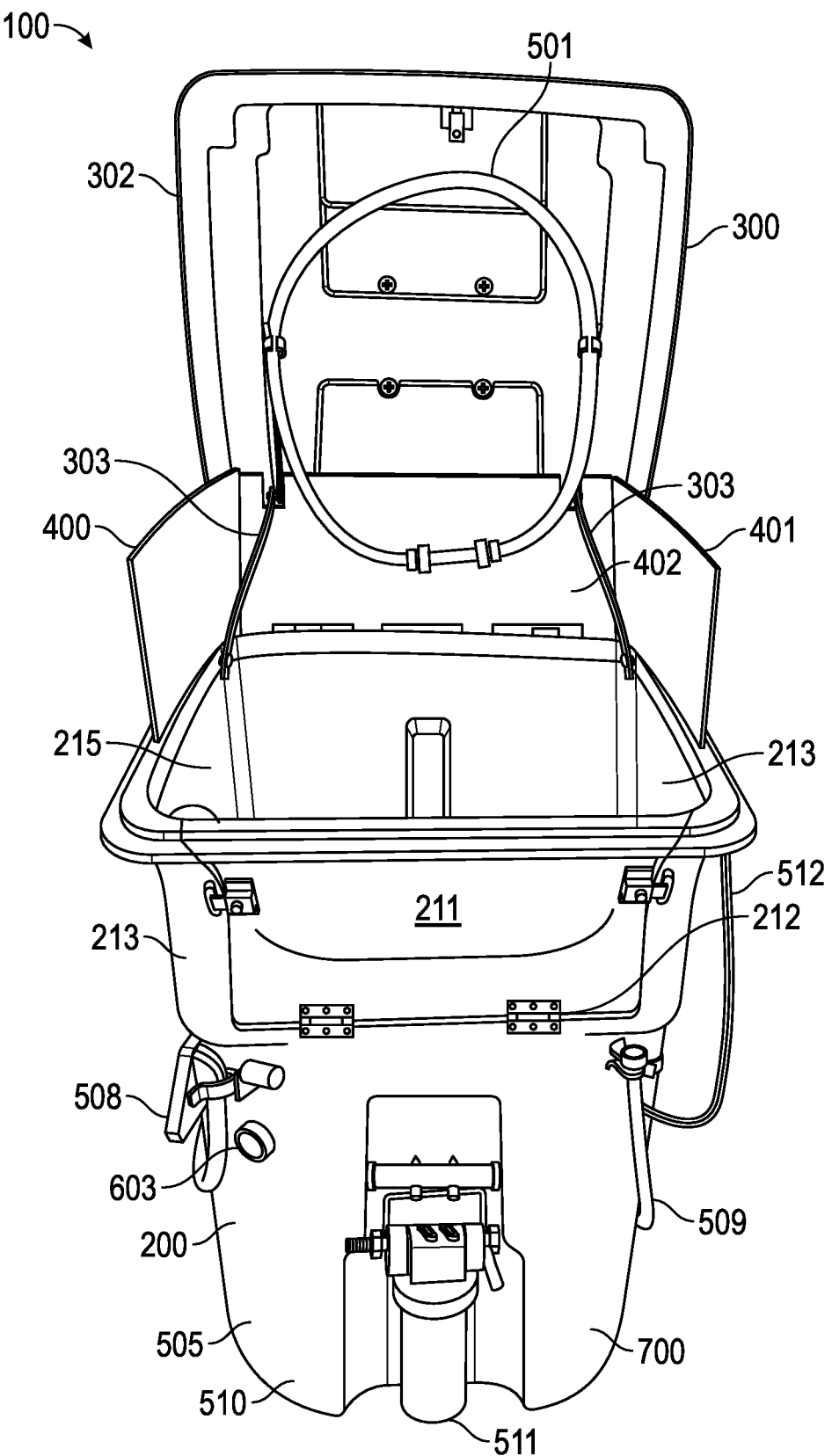
FIG. 2 shows front view of the pool filter cleaning system according to the first illustrated embodiment.
Figure 3:
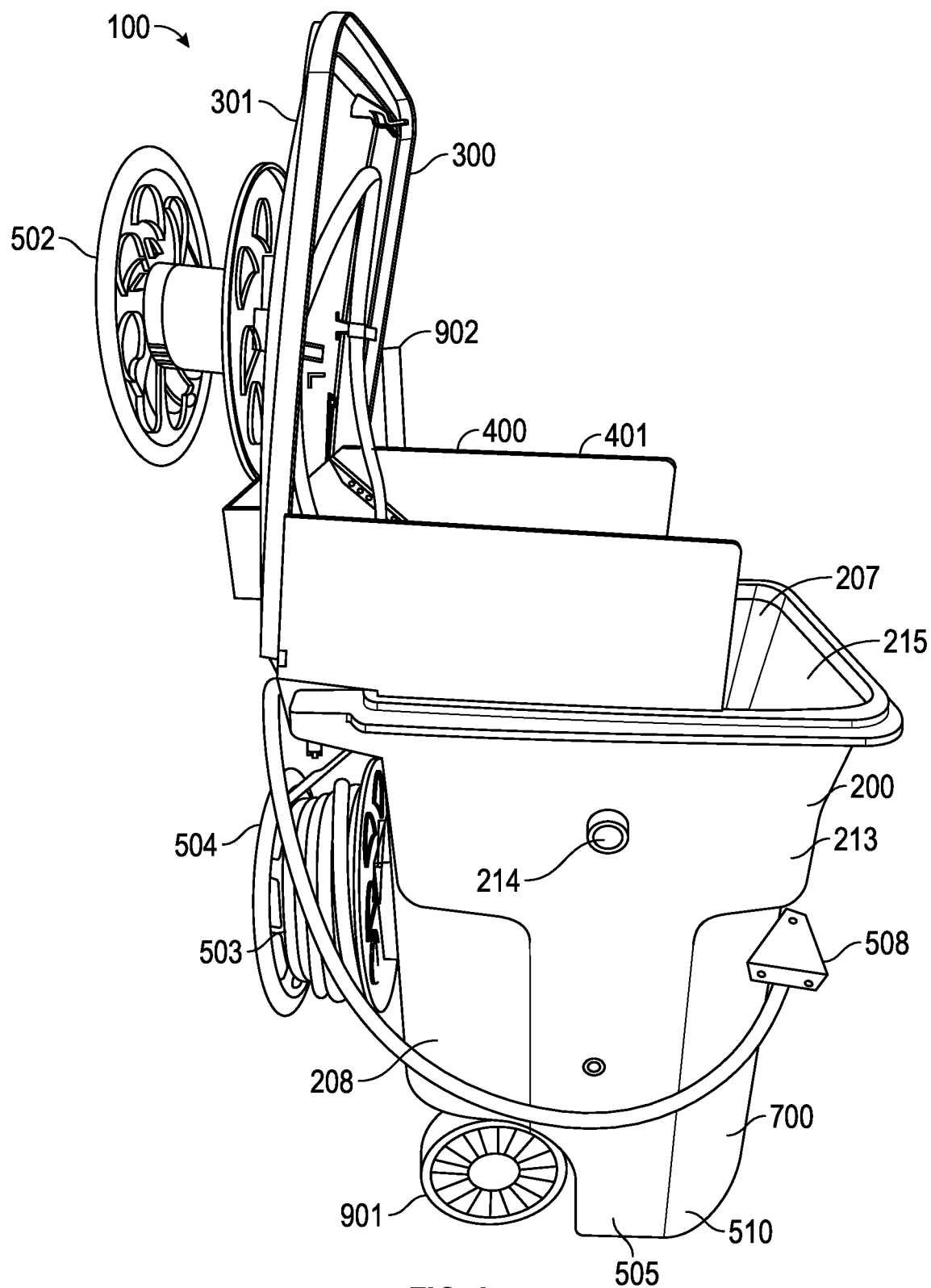
FIG. 3 shows a left side view of the pool filter cleaning system according to the first illustrated embodiment.
Figure 4:
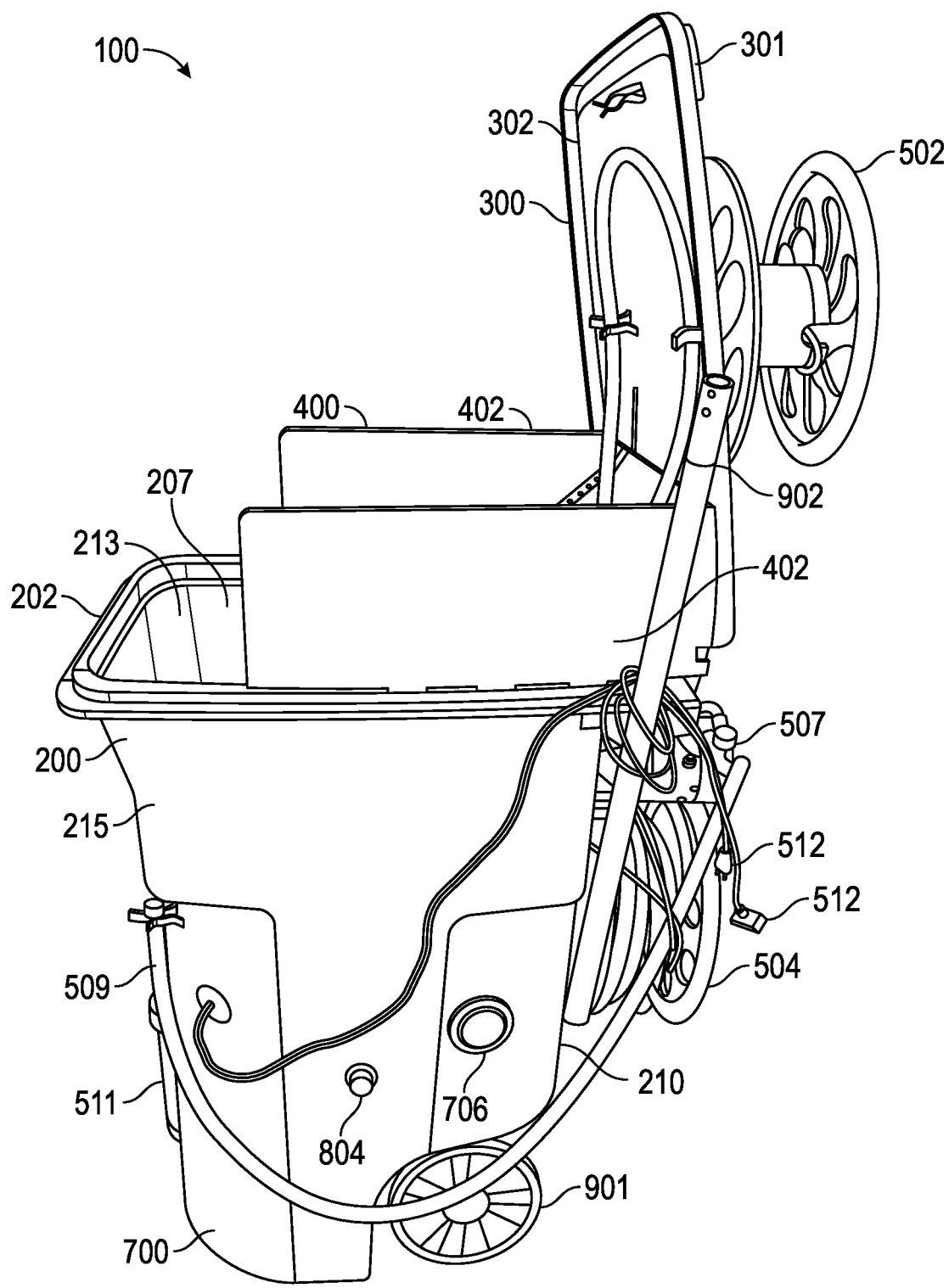
FIG. 4 shows a right side view of the pool filter cleaning system according to the first illustrated embodiment.
Figure 5:
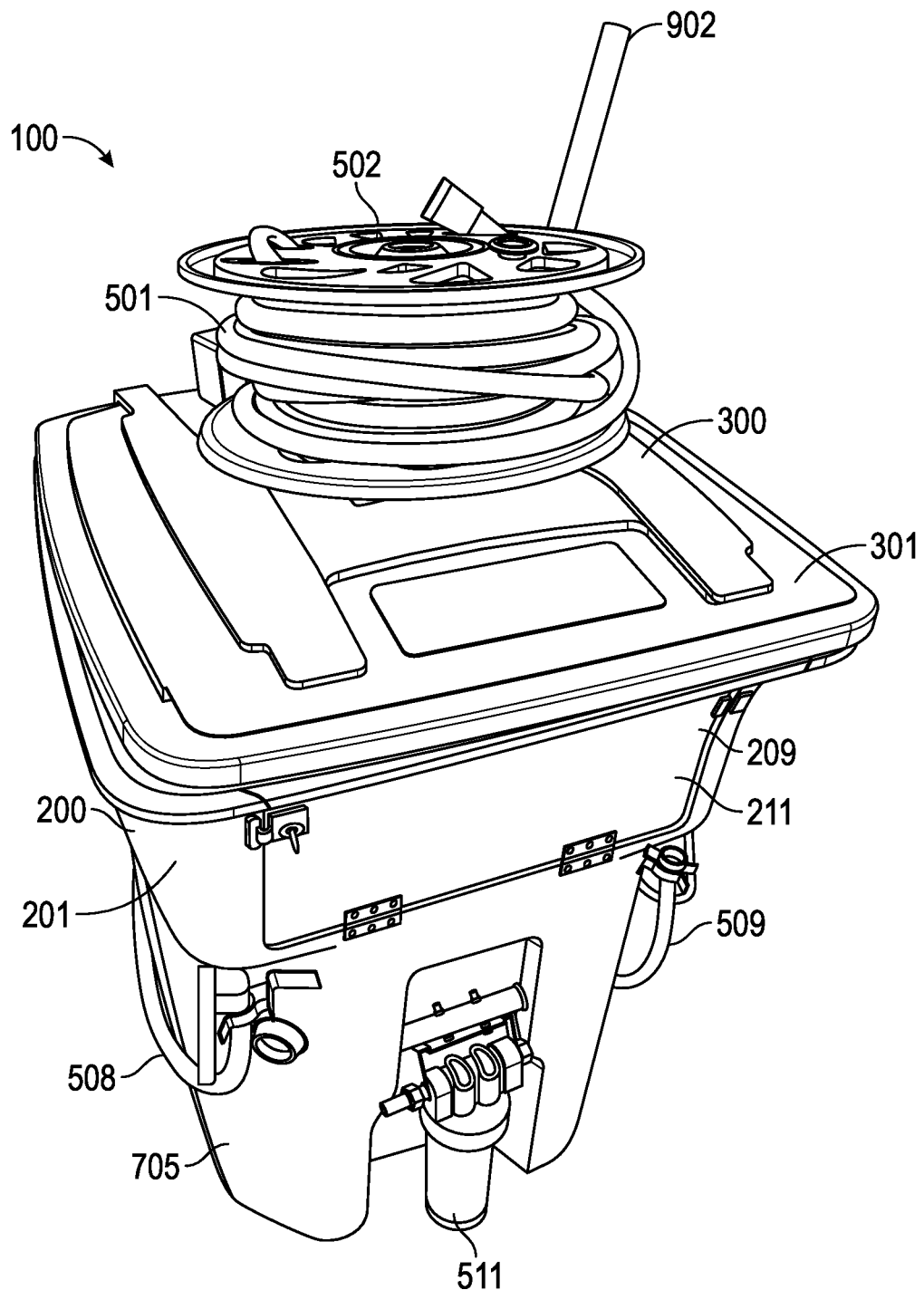
FIG. 5 shows an alternate perspective view of the pool filter cleaning system according to the first illustrated embodiment.
Figure 6:
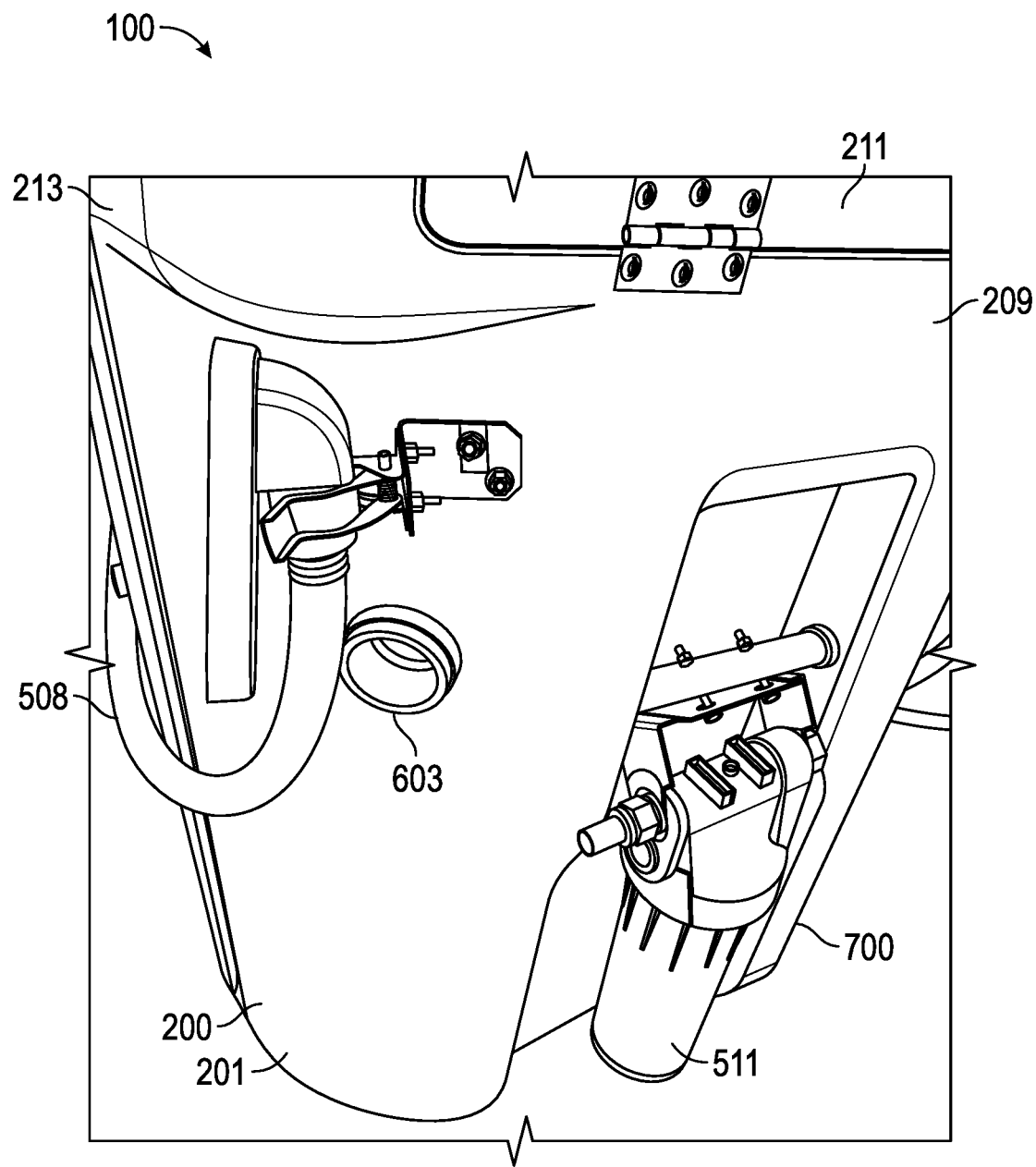
FIG. 6 shows a close-up view of the front side of the pool filter cleaning system according to the first illustrated embodiment.
Figure 7:
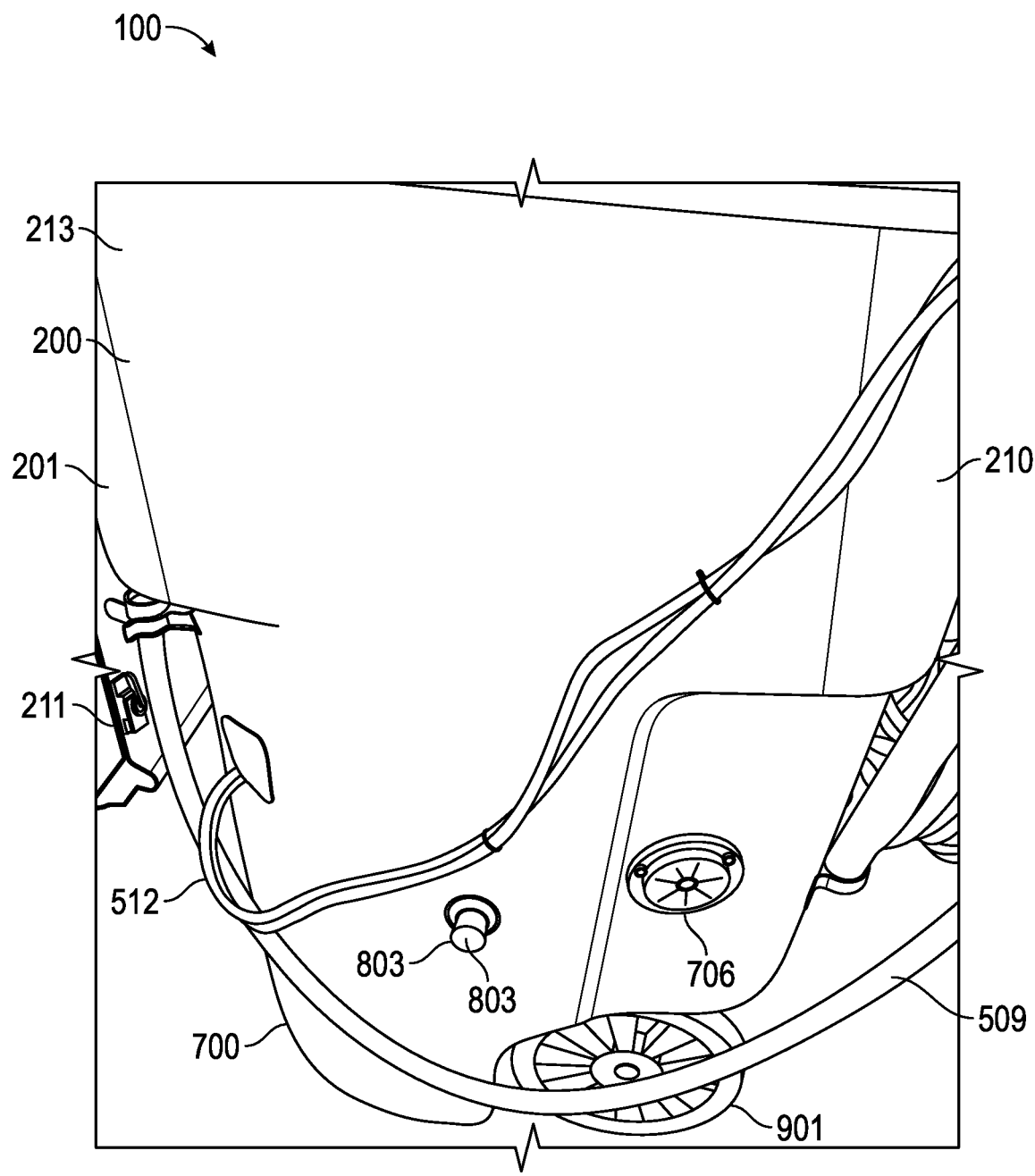
FIG. 7 shows a close-up view of the right side of the pool filter cleaning system according to the first illustrated embodiment.
Figure 8:
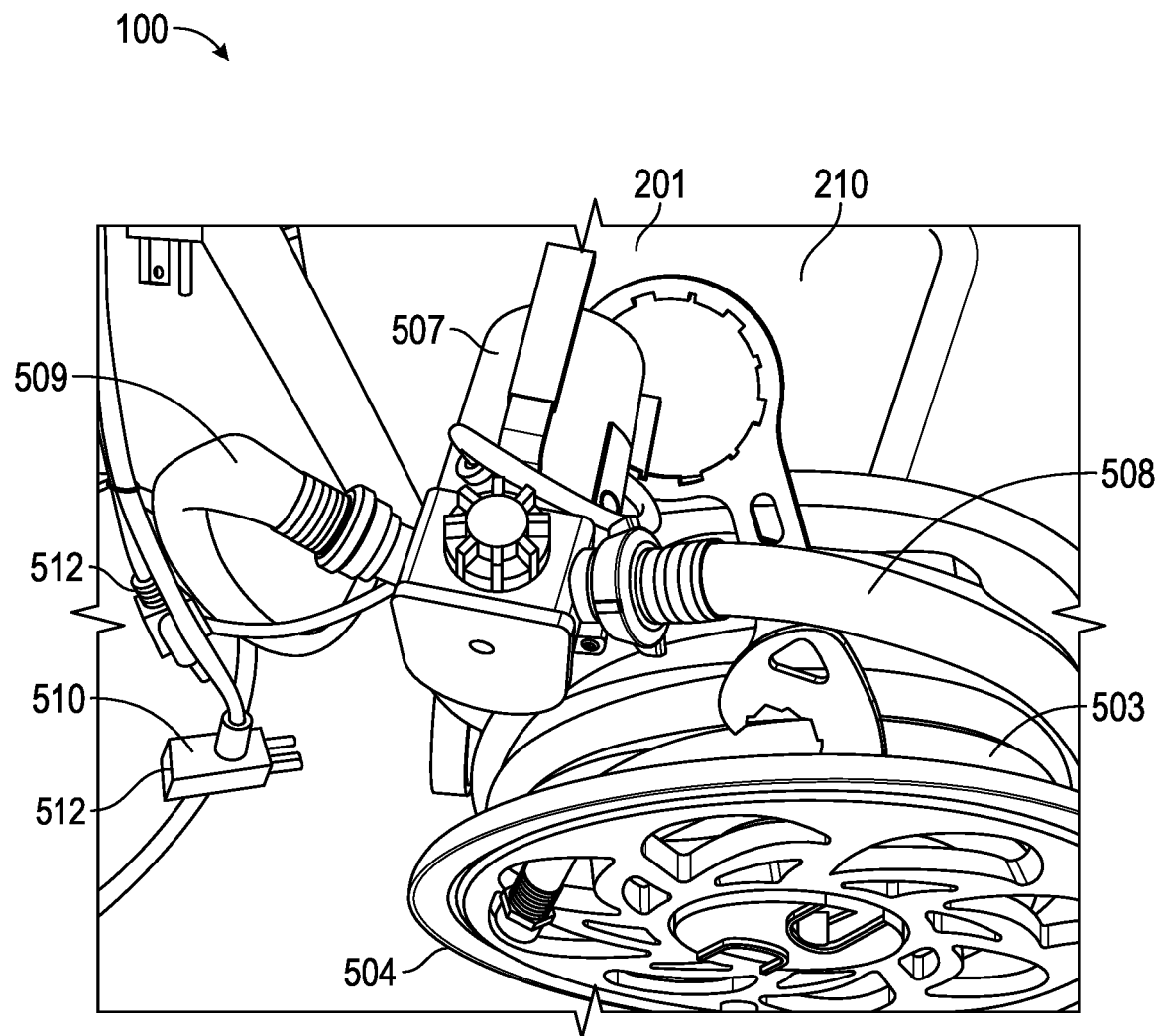
FIG. 8 shows a transfer pump of the pool filter cleaning system according to the first illustrated embodiment.
Figure 9:
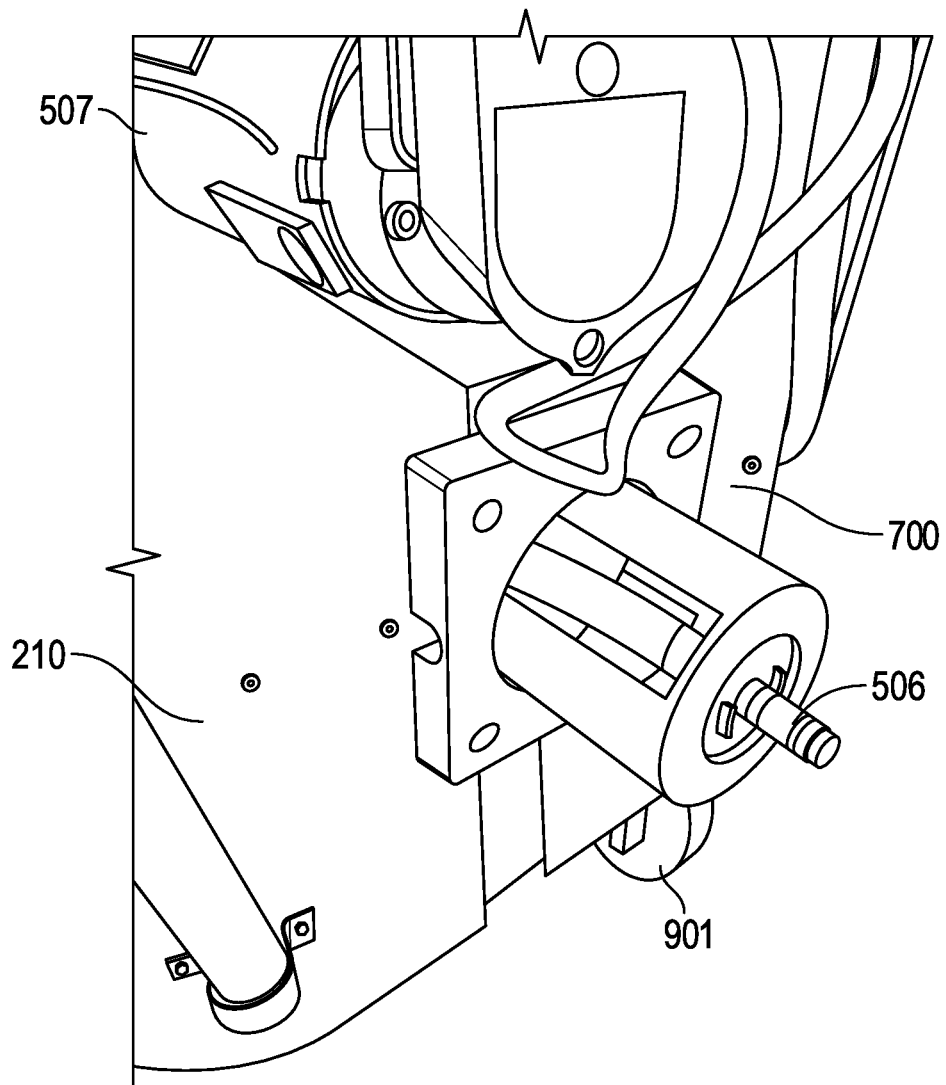
FIG. 9 shows a discharge pump outlet of the pool filter cleaning system according to the first illustrated embodiment.
Figure 10:
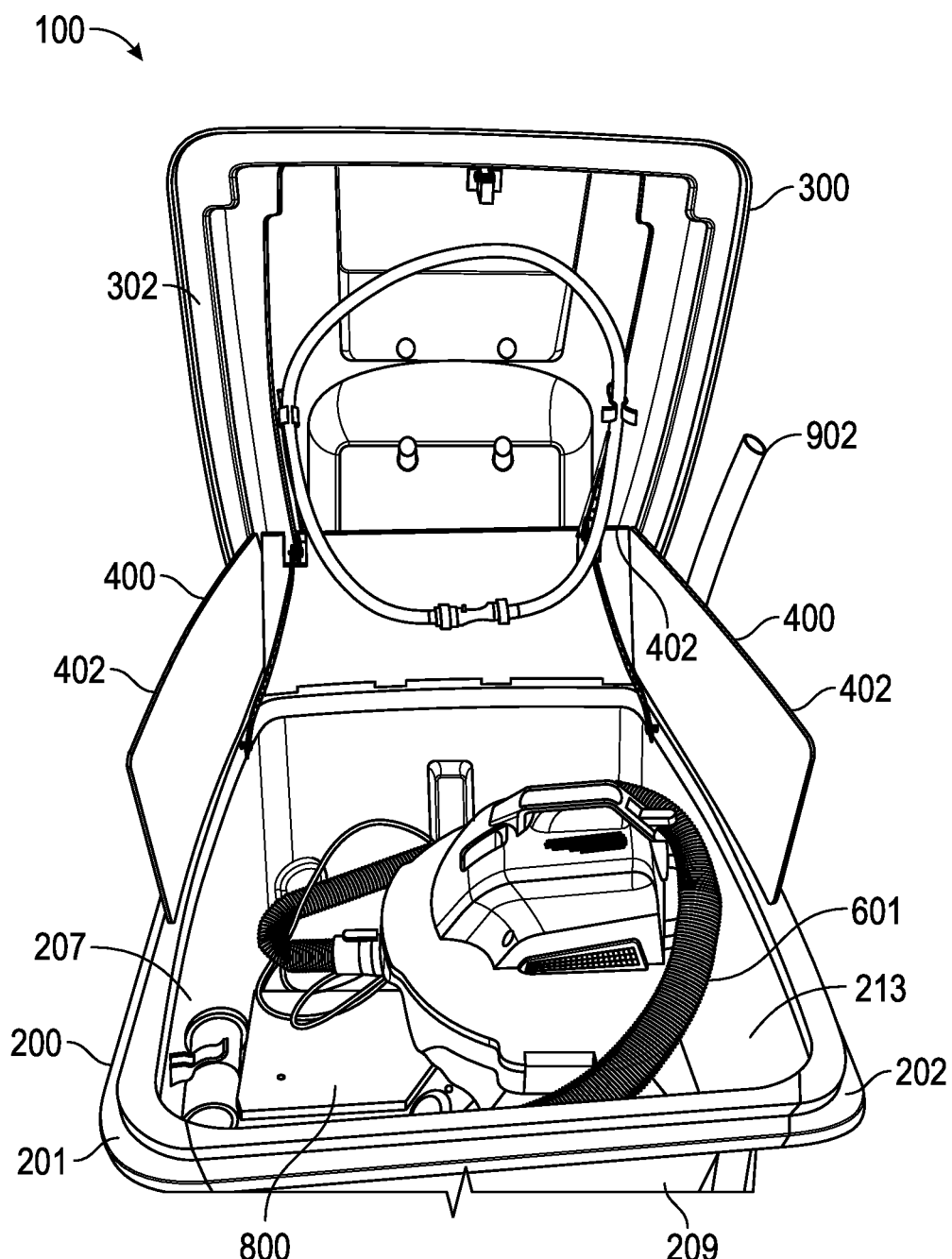
FIG. 10 shows a front view of an interior volume of the pool filter cleaning system according to the first illustrated embodiment.
Figure 11:
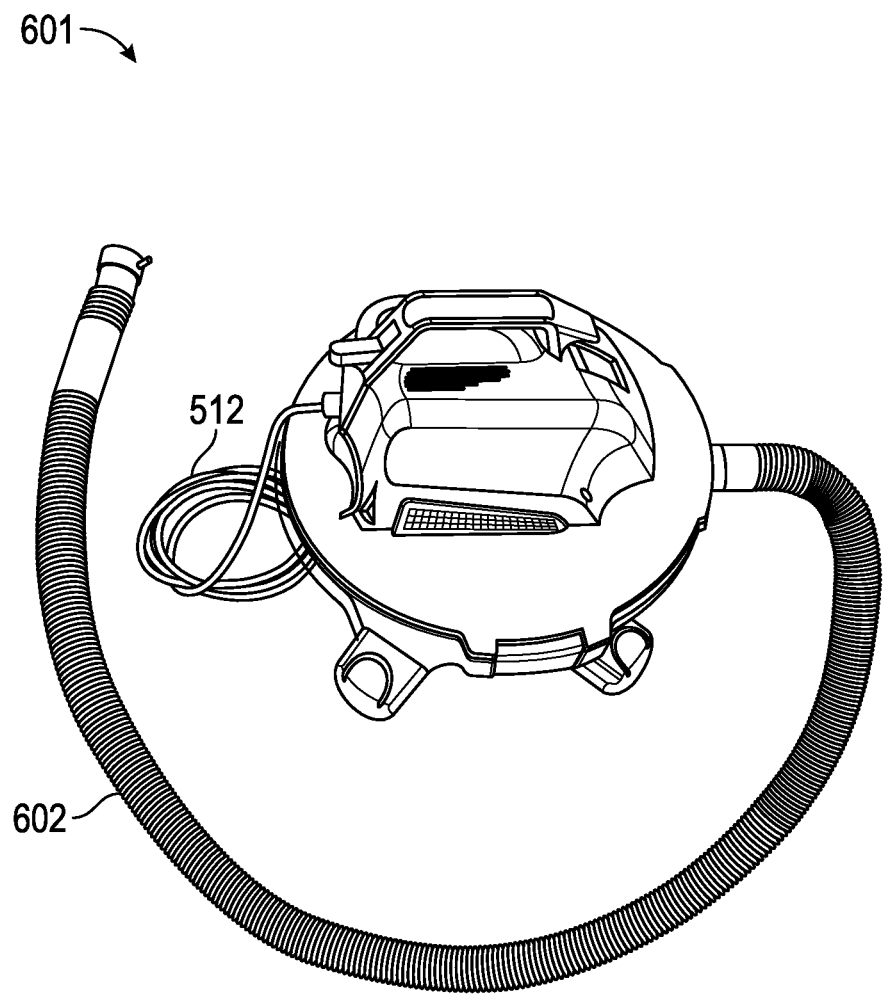
FIG. 11 shows a perspective view of a vacuum according to the first illustrated embodiment.
Figure 12:
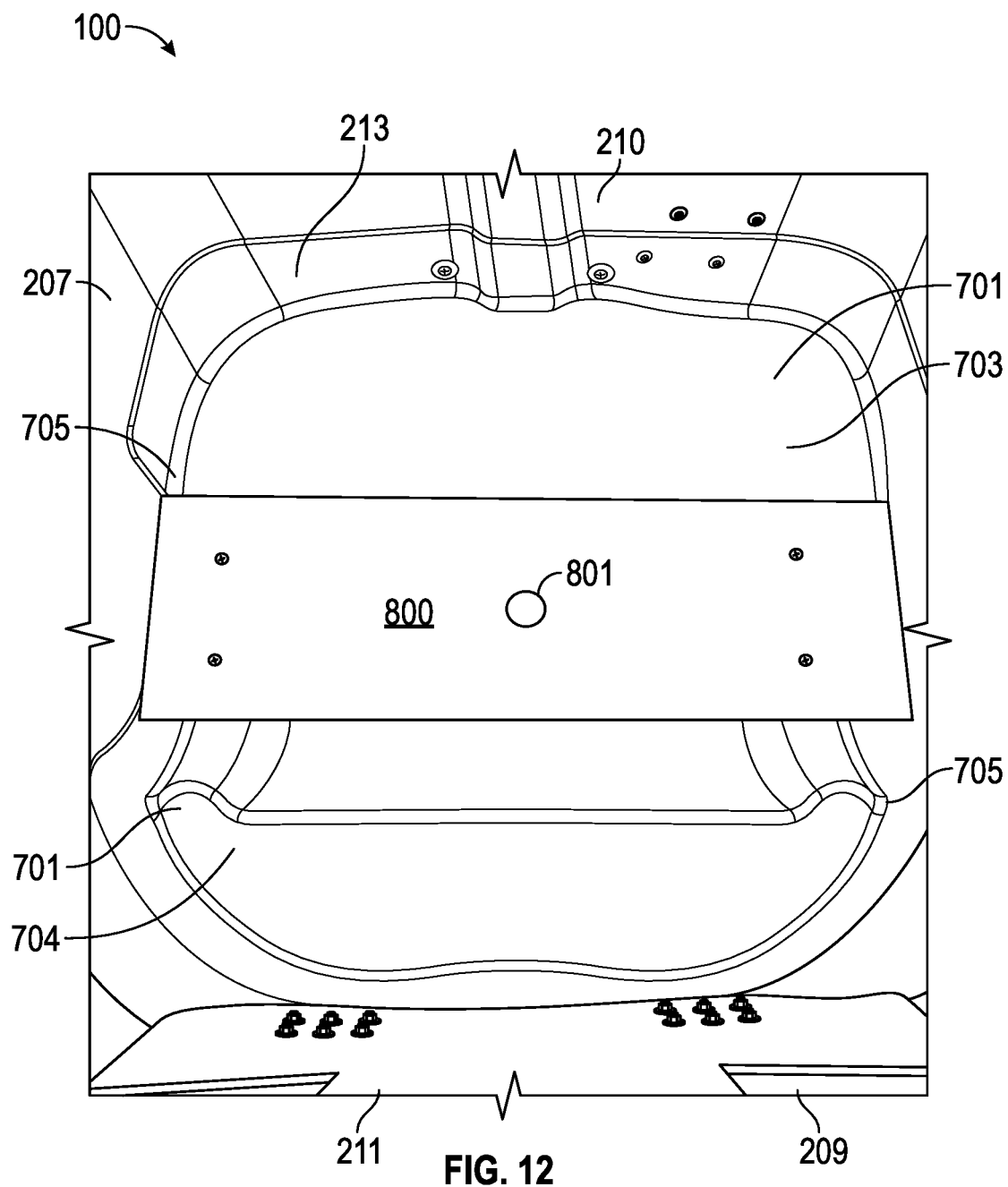
FIG. 12 shows a top view of an upper wash compartment according to the first illustrated embodiment.

For purposes of explanation and not limitation, details and descriptions of certain preferred embodiments are hereinafter provided such that one having ordinary skill in the art may be enabled to make and use the invention. These details and descriptions are representative only of certain preferred embodiments, however, a myriad of other embodiments which will not be expressly described will be readily understood by one having skill in the art upon a thorough review of the instant disclosure. Accordingly, any reviewer of the instant disclosure should interpret the scope of the invention only by the claims, as such scope is not intended to be limited by the embodiments described and illustrated herein.

For purposes herein, the term "contaminated pool filter" means any componentry of a pool filter that is contaminated with dirt and other pollutants and can include grids and cartridges of said pool filter among other components The term "pressure generator apparatus" means any apparatus capable of providing a positive or negative (vacuum) pressure. Examples can include, vacuums, compressors, blowers, pumps, and the like.

The term "pool-grade filter" means a filter designed for use in swimming pools with a primary purpose of removing impurities and particles from the pool water, thereby keep the water clean, clear, and safe for swimmers. Pool-grade filters can include sand, cartridges, and diatomaceous earth. Pool-grade filters are capable of filtering particles 40 microns or less. In some embodiments, the pool-grade filters are capable of filtering particles as small as 2 to 5 microns.

Unless explicitly defined herein, terms are to be construed in accordance with the plain and ordinary meaning as would be appreciated by one having skill in the art.

GENERAL DESCRIPTION OF EMBODIMENTS

In one embodiment, a pool filter cleaning system is disclosed. The pool filter system comprises a container body having an inner surface and an outer surface opposite the inner surface, the inner surface forming an interior volume. The interior volume is divided into an upper wash compartment and a lower catch chamber wherein the upper wash compartment is disposed above the lower catch chamber. The container body further comprises a front side, a back side opposite the front side, a plurality of laterals sides. and an upper rim comprising portions of the front side, back side, and the plurality of lateral sides. The system further comprises a container lid hingedly coupled to the container body at the back side, the container lid configured to engage with the upper rim. One or more lid support members are each coupled to both the container body and the container lid, the one or more lid support members configured to maintain the container lid in an upright and open position. A deployable shield is movably coupled to the upper rim at the back side and at least one of the plurality of lateral sides. The deployable shield comprises an upper edge that is positioned at a higher elevation than the upper rim. A system filter is disposed within the interior volume of the container body wherein the system filter is disposed between the upper wash compartment and the lower catch chamber. One or more sealed surfaces are coupled to the system filter and the inner surface of the container body, where at least one of the one or more sealed surfaces comprising a downward tilt for directing water toward the system filter. The system further comprises a cleaning platform disposed above the system filter, the cleaning platform supported by one or more support posts. The one or more support posts are each coupled to the inner surface of the container body wherein the cleaning platform is removably coupled to the one or more support posts. One or more pressure differential ports are disposed on the container body, the one or more pressure differential ports configured to receive a corresponding pressure generator apparatus for creating a pressure differential between the upper wash compartment and the lower catch chamber. A filtered water discharge pump is disposed within the lower catch chamber and is coupled to a discharge pump outlet wherein the discharge pump outlet extends through the container body at the lower catch chamber. A transfer pump is coupled to the outer surface of the container body, the transfer pump comprising an inlet house and an outlet hose. The container body further comprises wheels for mobility and transportability.

In some embodiments, the deployable shield may be detachably coupled to the upper rim. In some embodiments, the deployable shield may be retractably coupled to the upper rim. In some embodiments, wherein the deployable shield may be hingedly coupled to the upper rim.

In some embodiments, the deployable shield may further comprise a plurality of shield portions.

In some embodiments, the container body may further comprise a movable front portion disposed at the front side of the container body, the movable front portion comprising at least a portion of the upper rim, wherein the movable front portion is movably coupled to the container body such that the upper rim at the front side is configured to decouple from the container body.

In some embodiments, the system filter may comprise a pool-grade filter.

In some embodiments, the system filter may comprise a filtering capability of at least 40 microns.

In some embodiments, the system filter may further comprise diatomaceous earth disposed on the system filter, the system filter with the diatomaceous earth having a filtering capability of at least 5 microns.

In some embodiments, the system may further comprise a freshwater hose configured to attach to an exterior source and output water into the container body. In some embodiments, the system may further comprise a discharge hose and a freshwater hose.

In some embodiments, the system may further comprise a discharge hose configured to couple to the discharge pump outlet. The system may further comprise a detachable terminal filter configured to couple to the discharge hose.

In some embodiments, the cleaning platform may further comprise a mounting component configured to engage with a filter post of a contaminated pool filter, the mounting component comprising at least one of a post or an aperture.

In some embodiments, at least one of the one or more pressure differential ports may comprise a vacuum suction port disposed on the container body at the lower catch chamber. The vacuum suction port may be disposed at an upper half of the lower catch chamber.

In some embodiments, at least one of the one or more pressure differential ports may comprise a thrust port disposed on the container body at the upper wash compartment.

In some embodiments, the container body may further comprise an adjustable air vent disposed on the container body at the lower catch chamber.

In some embodiments, the system may further comprise a float switch electrically coupled to the filtered water discharge pump for automatic powering of the filtered water discharge pump when water disposed in the lower catch chamber is above a corresponding float level associated with the float switch. The float switch may be circumventable to manually power the filtered water discharge pump. The float level may be disposed vertically below a vacuum suction port, the vacuum suction port disposed on the container body at the lower catch chamber.

In some embodiments, the system filter may further comprise a channel extending through a middle portion thereof. The system filter may further comprise a perforated tube extending through the channel, the perforated tube having an externally accessible outlet extending through the container body for flushing the system filter.

In some embodiments, the system may further comprise a precursor filter disposed between the system filter and the cleaning platform.

In another embodiment, a pool filter cleaning system is disclosed. The system comprises a container body having an inner surface and an outer surface opposite the inner surface, the inner surface forming an interior volume. The interior volume is divided into an upper wash compartment and a lower catch chamber wherein the upper wash compartment is disposed above the lower catch chamber. The container body further comprises a front side, a back side opposite the front side, a plurality of laterals sides, and an upper rim comprising portions of the front side, back side, and the plurality of lateral sides. A system filter is disposed within the interior volume of the container body wherein the system filter is disposed between the upper wash compartment and the lower catch chamber. One or more sealed surfaces are coupled to the system filter and the inner surface of the container body. At least one of the one or more sealed surfaces comprises a downward tilt for directing water toward the system filter. A cleaning platform is disposed above the system filter and is supported by one or more support posts. The one or more support posts each coupled to the inner surface of the container body wherein the cleaning platform is removably coupled to the one or more support posts. One or more pressure differential ports are disposed on the container body. The one or more pressure differential ports are configured to receive a corresponding pressure generator apparatus for creating a pressure differential between the upper wash compartment and the lower catch chamber. A filtered water discharge pump is disposed within the lower catch chamber and is coupled to a discharge pump outlet wherein the discharge pump outlet extends through the container body at the lower catch chamber. The container body further comprises wheels coupled thereto for mobility.

In some embodiments, the system further may comprise a container lid hingedly coupled to the container body at the back side, the container lid configured to engage with the upper rim. The system may further comprise none or more lid support members each coupled to both the container body and the container lid, the one or more lid support members configured to maintain the container lid in an upright and open position.

In some embodiments, the system may further comprise a transfer pump coupled to the outer surface of the container body, the transfer pump comprising an inlet house and an outlet hose.

In some embodiments, the system may further comprise a deployable shield movably coupled to the upper rim at the back side and at least one of the plurality of lateral sides, the deployable shield comprising an upper edge that is positioned at a higher elevation than the upper rim.

In some embodiments, the deployable shield may be detachably coupled to the upper rim. In some embodiments, the deployable shield may be retractably coupled to the upper rim. In some embodiments, wherein the deployable shield may be hingedly coupled to the upper rim.

In some embodiments, the deployable shield may further comprise a plurality of shield portions.

In some embodiments, the container body may further comprise a movable front portion disposed at the front side of the container body, the movable front portion comprising at least a portion of the upper rim, wherein the movable front portion is movably coupled to the container body such that the upper rim at the front side is configured to decouple from the container body.

In some embodiments, the system filter may comprise a pool-grade filter.

In some embodiments, the system filter may comprise a filtering capability of at least 40 microns.

In some embodiments, the system filter may further comprise diatomaceous earth disposed on the system filter, the system filter with the diatomaceous earth having a filtering capability of at least 5 microns.

In some embodiments, the system may further comprise a freshwater hose configured to attach to an exterior source and output water into the container body. In some embodiments, the system may further comprise a discharge hose and a freshwater hose.

In some embodiments, the system may further comprise a discharge hose configured to couple to the discharge pump outlet. The system may further comprise a detachable terminal filter configured to couple to the discharge hose.

In some embodiments, the cleaning platform may further comprise a mounting component configured to engage with a filter post of a contaminated pool filter, the mounting component comprising at least one of a post or an aperture.

In some embodiments, at least one of the one or more pressure differential ports may comprise a vacuum suction port disposed on the container body at the lower catch chamber. The vacuum suction port may be disposed at an upper half of the lower catch chamber.

In some embodiments, at least one of the one or more pressure differential ports may comprise a thrust port disposed on the container body at the upper wash compartment.

In some embodiments, the container body may further comprise an adjustable air vent disposed on the container body at the lower catch chamber.

In some embodiments, the system may further comprise a float switch electrically coupled to the filtered water discharge pump for automatic powering of the filtered water discharge pump when water disposed in the lower catch chamber is above a corresponding float level associated with the float switch. The float switch may be circumventable to manually power the filtered water discharge pump. The float level may be disposed vertically below a vacuum suction port, the vacuum suction port disposed on the container body at the lower catch chamber.

In some embodiments, the system filter may further comprise a channel extending through a middle portion thereof. The system filter may further comprise a perforated tube extending through the channel, the perforated tube having an externally accessible outlet extending through the container body for flushing the system filter.

In some embodiments, the system may further comprise a precursor filter disposed between the system filter and the cleaning platform.

In one aspect, a method of cleaning a contaminated pool filter associated with a pool is disclosed. The method comprises: (i) receiving a contaminated filter for cleaning, the contaminated pool filter being disposed on a cleaning platform wherein the cleaning platform is positioned within an upper wash compartment of a container body; (ii) outputting freshwater to clean the contaminated pool filter; (iii) collecting contaminated water over a system filter, the system filter being disposed below the cleaning platform; (iv) receiving a pressure generator apparatus at one or more pressure differential ports disposed on the container body; (v) forming a pressure differential between the upper wash compartment and the lower catch chamber; (vi) filtering the contaminated water through the system filter and into a lower catch chamber disposed below the system filter, wherein the contaminated water transforms into filtered water; (vii) pumping the filtered water out of the lower catch chamber; and (viii) expelling the filtered water back into the pool.

In some aspects, forming the differential pressure may further comprise generating a vacuum within the lower catch chamber.

In some aspects, forming the differential pressure may further comprise generating a pressure within the upper wash compartment.

In some aspects, the method may further comprise filtering the filtered water with a detachable terminal filter prior to expelling the filtered water back into the pool.

In some aspects, the method may further comprise receiving a layer of diatomaceous earth on the system filter.

In another aspect, a method of cleaning a contaminated pool filter associated with a pool is disclosed. The method comprises: (i) attaching a freshwater hose of a pool filter cleaning system to an external water source, the pool filter cleaning system comprising a container having a container lid and a container body; (ii) opening the container lid and locking the container lid into place with one or more lid support members; (iii) lowering a movable front portion for providing sufficient work space; (iv) utilizing deployable shields at an upper rim of the container body; (v) applying a layer of clean diatomaceous earth to a system filter; positioning a cleaning platform inside the container body such that the cleaning platform is disposed above the system filter; (vi) placing the contaminated pool filter onto the cleaning platform; (vii) washing the contained pool filter with the freshwater hose; (viii) attaching a pressure generator apparatus to a pressure differential port to form a pressure differential about the system filter; (ix) moving the cleaning platform to expose the system filter wherein the system filter comprises leftover debris from the contaminated water; removing the leftover debris; (x) connecting a discharge hose to a filtered water discharge pump; powering the filtered water discharge to remove clean water from the lower catch chamber; and (xii) expelling the filtered water back into the pool.

In some aspects, attaching the pressure generator apparatus to the pressure differential port may further comprise=attaching a vacuum to a vacuum suction port, the vacuum suction port being disposed on the container body below the system filter.

In some aspects, attaching the pressure generator apparatus to the pressure differential port may further comprise attaching a blower to a thrust port, the thrust port being disposed on the container body above the system filter.

Container Body

The pool filter cleaning system may comprise an assortment of pumps, hoses, and filtration features which are mounted to a container having a container body and a container lid. The container body may serve as the structure onto various system components are mounted. In some embodiments, the container may be a trashcan sized container. The container may have wheels connected near the bottom such that the container may be more easily maneuvered and transported.

In some embodiments, the container body may have a top side, a bottom side, and a plurality of lateral sides, which may include a front side and a back side. Together, the sides of the container form an outer surface of the container body. The container body has an inner surface opposite the outer surface which forms an interior volume. In some embodiments, the interior volume is divided into an upper wash compartment and a lower catch chamber.

Container Lid

The container lid may be hingedly coupled to the container body. The container lid may be a generally flat feature having a top side facing upwards and a bottom side facing downwards. The container lid may rest on the upper rim of the container body where the upper rim may comprise a top edge of multiple sides, including a front edge, a rear edge, a first side edge, and a second side edge. In some embodiments, the top side of the container lid is movably attached to the upper rim of the container body. In the preferred embodiment, the lid of the container is pivotally attached to the rear edge of the container body. This may allow a user to lift up the lid, exposing the interior volume of the container.

In some embodiments, the container body is configured with a plurality of lid support members. After the container lid is opened, the lid support members may be engaged such that the container lid is supported in an open position. In some embodiments, the lid support members are automatically engaged when the lid is lifted. In some embodiments, the lid support members may be gas struts. By supporting the container lid in the open position, the lid support members allow the user to work within the container to clean a contaminated pool filter.

Deployable Shield

In some embodiments, the pool filter cleaning system may include a deployable shield. As the user washes the contaminated pool filter, water may splash outside the container body. To help contain this splashing water, the user may install or deploy the deployable shield above some or all of the upper rim of the container. In some embodiments, the upper rim comprises slots such that a lower edge of a plurality of shield portions may be inserted into the slots, holding the plurality of shield portions in place. An upper edge of the deployable shield is at a higher elevation than the upper rim of the container to help prevent water from splashing out from the interior of the container. In some embodiments, the deployable shield comprises a monolithic piece. In other embodiments, the deployable shield comprises the plurality of shield portions. In other embodiments, the deployable shield may be retractably or hingedly coupled to the container body.

Movable Front Portion

In some embodiments, the pool filter cleaning system may comprise a movable front portion. The movable front portion may be disposed on the front side of the container. When operating the pool filter cleaning system, the user may move or remove the movable front portion. This will essentially lower the upper rim height of the front side of the container. Lowering the height of the front side of the container allows the user to more easily access the interior volume of the container. The user may lean in and reach the contaminated pool filter, filter platform, the system filter, or any other object or feature contained within the interior volume of the container.

In some embodiments, the movable front portion may be hingedly attached to the front side of the container. The hinges may connect a lower edge of the movable front portion to the front side of the container. In some embodiments, the movable front portion may utilize latches to hold the movable front portion in an upright position. The user could then disengage the latches and pivot the movable front portion downward and away from the container.

Freshwater Hose

The pool filter cleaning system may utilize a freshwater hose to supply the water used to wash a contaminated pool filter. In some embodiments, the freshwater hose is wrapped around a first reel. In some embodiments, the first reel may be attached to the container. In a preferred embodiment, the first reel is attached to the top side of the container lid. The user may attach one end of the freshwater hose to a water supply, such as city water, and spray the water at the contaminated pool filter placed within the pool filter cleaning system container.

Cleaning Platform

In some embodiments, there may be a cleaning platform disposed within the container to support the contaminated pool filter during cleaning. The cleaning platform may be supported by the interior walls of the container. The cleaning platform may be supported from below using structural members attached to a surface below the platform. In some embodiments, the platform can be supported by a plurality of support posts which run generally horizontal across the interior surface of the container body.

The cleaning platform may provide a means of mounting the contaminated pool filter to the cleaning platform. In some embodiments, the cleaning platform may include an aperture such that the contaminated pool filter comprising a filter post may engage with the cleaning platform. In other embodiments, the cleaning platform may include a post such that the contaminated pool filter comprising a filter aperture may engage with said post.

In some embodiments, the cleaning platform is removable. The cleaning platform may be removed so the user may have access to a system filter disposed below the cleaning platform. In some embodiments, the cleaning platform may be movable. For example, the cleaning platform may be hingedly attached to its supports such that it can be pivoted out of a deployed position.

System Filter

Generally, the pool filter cleaning system comprises a system filter to catch debris washed off of the contaminated pool filter. The system filter may be disposed below the contaminated pool filter such that contaminated wash water collects over the system filter via gravity. The system filter may be integrated with a bottom surface of the upper wash compartment or it may be separable from the bottom surface such that the user may remove the system filter. Generally, the system filter divides the interior volume of the container body into an upper catch compartment and a lower catch chamber.

In some embodiments, the system filter covers only a portion of a cross-sectional area of the interior of the container body. In remaining areas of the cross-sectional area not occupied by the system filter, the system comprises a sealed surface which directs the contaminated wash water towards the system filter. The sealed surface may comprise a first sealed surface and a second sealed surface. The first sealed surface can be disposed against the inner surface at the back side of the container body. The second sealed surface may be disposed against the inner surface at the front side of the container body. Perimeter of the sealed surfaces may be sealed against the inner surface of the container body with a sealing agent such as silicone. The planes of the sealed surfaces may be tilted towards the system filter to aid the contaminated wash water to collect over the system filter.

In some embodiments, the cleaning system may utilize pool-grade filters. In some embodiments, the system filter may comprise a filtering capability of 5 microns or less similar to high filtering level capability in commercial filters available in the market.

In some embodiments, an additive such as diatomaceous earth may be added. The diatomaceous earth may be applied to the system filter to improve its performance in filtering debris out of the contaminated wash water. In some embodiments, multiple system filters may be utilized in parallel with each other. In other embodiments, multiple system filters may be utilized in series with each other.

When diatomaceous earth is applied to the system filter, the system filter itself may comprise a filtering capability of around 40 microns such that when used in conjunction with the diatomaceous earth will provide the 5 microns of filtering capability as is known for diatomaceous earth filters.

Lower Catch Chamber

After the wash water drains through the system filter it may fall into a lower catch chamber disposed below the system filter. The lower catch chamber is water tight and is configured to collect the filtered water. In some embodiments, a filtered water discharge pump (FWDP) may be configured within the lower catch chamber such that the filtered water may be pumped out of the lower catch chamber. In preferred embodiments, the FWDP may be a submersible utility pump. The inlet to the FWDP may be configured such that it draws from the bottom of the lower catch chamber. The outlet of the FWDP may be coupled to a discharge pump outlet which penetrates a side wall of the lower catch chamber. Annular space between the discharge pump outlet and the penetration may be sealed to help maintain a relatively sealed lower catch chamber. A power cable and any other electronic wiring for the FWDP may pass through the side wall of the lower catch chamber. The electrical penetrations are similarly sealed to help maintain a relatively air-tight catch chamber.

Vacuum

In some embodiments, the pool filter cleaning system further comprises a vacuum to expedite the filtering process. When using a higher-grade filter for the system filter to remove more contaminants from the contaminated water, using only gravity to pull the contaminated water through the system filter may not be enough to filter the contaminated water in a reasonable amount of time. The vacuum may be utilized to push and/or pull the wash water through the system filter.

In some embodiments, the lower catch chamber may be configured with a vacuum suction port through the side wall. The user may insert a vacuum suction hose of the vacuum into the vacuum suction port such that when the vacuum is turned on air in the lower catch chamber is sucked into the vacuum. In some embodiments, the system filter is generally the only means for air to ingress into the lower catch chamber to replace the vacuumed air. In some embodiments, the lower catch chamber may comprise an adjustable suction air vent to mitigate overheating of the vacuum when the system filter is heavily impacted with contaminants. The vacuum may cause a pressure differential across the system filter which draws the contaminated wash water through the system filter faster than with only gravity. By utilizing a vacuum connected to the generally sealed lower catch chamber the time required to drain the upper wash compartment of contaminated wash water is reduced.

In some embodiments, the upper wash compartment may comprise one of more thrust ports for receiving a reversible vacuum or other types of air output apparatuses. The one or more thrust ports are configured to receive air which enters the upper wash compartment and applies a downward pressure on any contaminated wash water resting on the system filter. In some embodiments, the container lid forms a generally air tight seal with the upper rim of the container body when the container lid is in the closed position.

Transfer Pump

The pool filter cleaning system may include a transfer pump for transferring contaminated water disposed within a user's pool filter housing prior to removing the contaminated pool filters therefrom. Conventionally, the pool filter housing comprises contaminated water that must be removed prior to extracting the contaminated pool filters for cleaning. The pool filter housing would normally be drained, thereby causing any contaminated water to expel from the pool filter housing onto the ground below. The transfer pump eliminates this hazardous step by pulling the contaminated water from the pool system into the filter cleaning system.

The transfer pump may be mounted to the container. In some embodiments, the transfer pump is mounted to the back side of the container body. The transfer pump may have an inlet hose which is configured to be placed within a user's pool filter housing, and a transfer pump discharge hose which is directed into the upper wash compartment. The contaminated water may be drawn from the pool filter housing into the pool filter cleaning system prior to the user removing the contaminated pool filters from the pool filter housing.

In one aspect, a method of removing contaminated water from a user's pool filter housing with the transfer pump is disclosed. The method may comprise: (i) positioning a pool filter cleaning system near the user's pool filter housing; (ii) connecting a transfer pump of the pool filter cleaning system to a power source; (iii) disposing an inlet hose of the transfer pump into the user's pool filter housing; (iv) disposing a transfer pump discharge hose of the transfer pump into an upper wash compartment of the pool filter cleaning system; and (v) powering on the transfer pump to extract the contaminated water from the user's pool filter housing to the pool filter cleaning system.

While various details, features, combinations are described in the illustrated embodiments, one having skill in the art will appreciate a myriad of possible alternative combinations and arrangements of the features disclosed herein. As such, the descriptions are intended to be enabling only, and non-limiting. Instead, the spirit and scope of the invention is set forth in the appended claims.

Illustrated Embodiment

Now turning to the drawings, FIG. 1-9 shows various views of the pool filter cleaning system (100). The pool filter cleaning system comprises a container body (201) having a front side (209), a back side (210) opposite the front side, and a plurality of lateral sides. The container body further comprises an outer surface (208) and an inner surface (207) opposite the outer surface wherein the inner surface comprises an interior volume (215). The interior volume is divided into an upper wash compartment (213) and a lower catch chamber (700). The upper wash compartment is where contaminated pool filters are placed in and cleaned. The lower catch chamber is disposed below the upper wash compartment and is configured to received filtered water that can be discharge safely into a storm drain or even back into an associated pool of the contaminated pool filters. Wheels (901) are coupled to the container body to allow the pool filter cleaning system be easily movable and portable. An umbrella holder (902) is coupled to the container body to provide shade to the operator.

A container lid (300) is hingedly coupled to the container body (201) at the back side (210), the container lid being held upright by lid support members (303) at a bottom side (302) thereof and is utilized during cleaning. The container body further comprises an upper rim (202) that divides the inner surface (207) from the outer surface (208). The upper rim comprises a deployable shield (400) coupled thereto/. The deployable shield is configured to block water sprayed within the upper wash compartment (213) to mitigate contaminants leaving the container body. An upper edge (401) of the deployable shield is elevated above the upper rim of the container body to achieve said blocking feature. The deployable shield can be integrally formed or be separate and distinct pieces comprising a plurality of shield portions (402) as shown. The deployable shield is removable from slots disposed in the upper rim in order for the container lid to fully close. The front side (209) of the container body comprises a movable front portion (211) configured to hingedly rotate about the container body in order for an operator to have more workspace and be able to reach down into the upper wash compartment.

The pool filter cleaning system (100) comprises a freshwater hose (501) and a discharge hose (503) used for particular purposes. The freshwater hose is configured to connect with an external water source and is used to output freshwater for cleaning the contaminated pool filters. The freshwater hose can be stored at the bottom side (302) of the container lid (300) or to a first reel (502) coupled to a portion of the container body (201), such as a top side (301) of the container lid. The discharge hose is configured to attach to a discharge pump outlet (506) for removing filtered water from the lower catch chamber (700). The discharge hose is stored to a second reel (504) disposed on the back side (210) of the container body.

The pool filter cleaning system (100) further comprises a transfer pump (507) coupled to the back side (210) of the container body (201). The transfer pump includes both a transfer pump inlet hose (508) and a transfer pump discharge hose (509). The transfer pump inlet hose is configured to be placed within a pool filter system for extracting contaminated water resting inside the pool filter system. The transfer pump pulls the contaminated water through the transfer pump inlet hose and discharges the contaminated water out of the transfer pump outlet hose and inside the upper wash compartment (213) of the container body where the contaminated water can be processed and filtered similarly to debris removed from the contaminated pool filters themselves. The transfer pump comprises an electrical connector (512) for receiving power.

Figure 13:
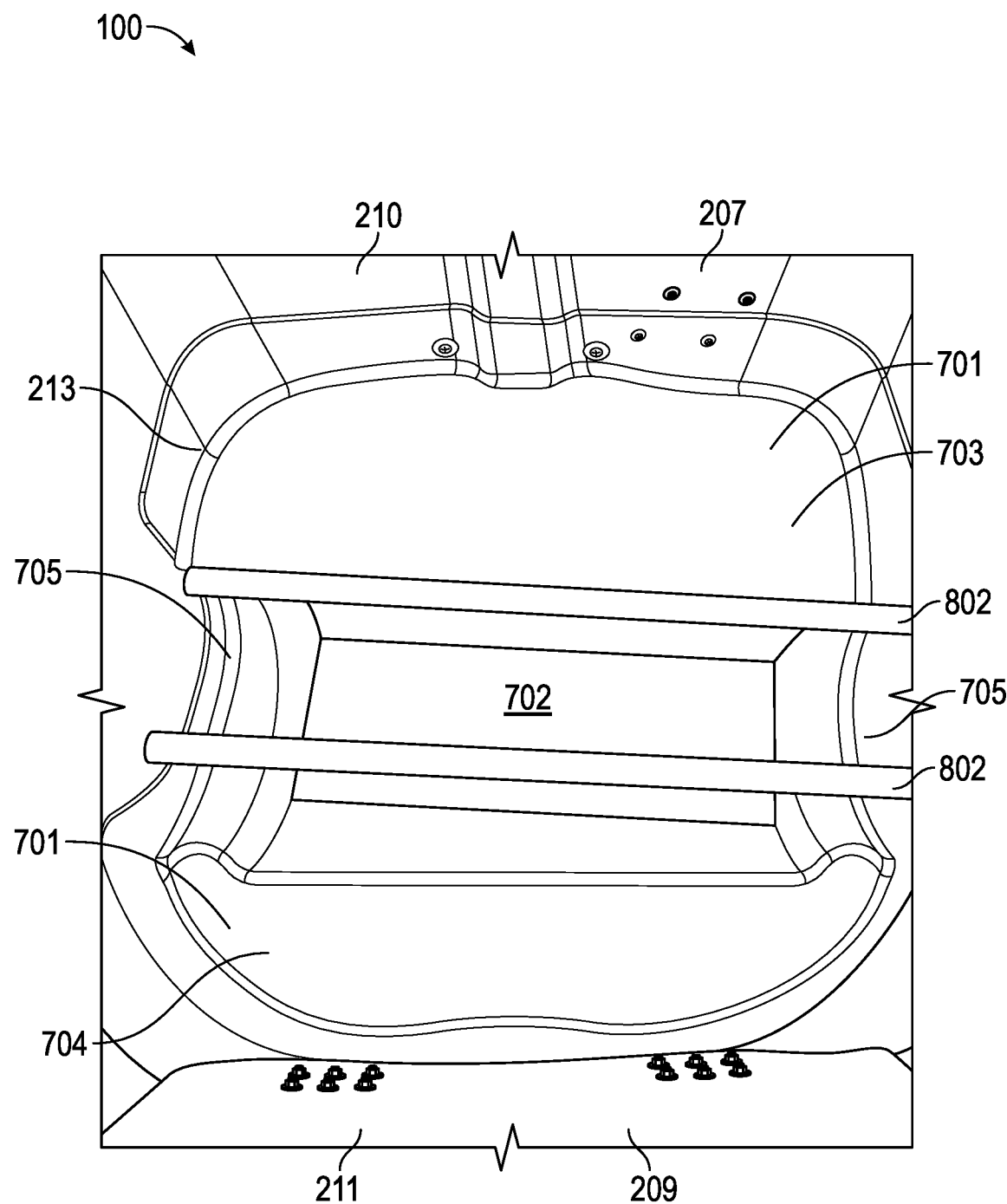
FIG. 13 shows an alternative top view of the upper wash compartment according to the first illustrated embodiment.
Figure 14A:
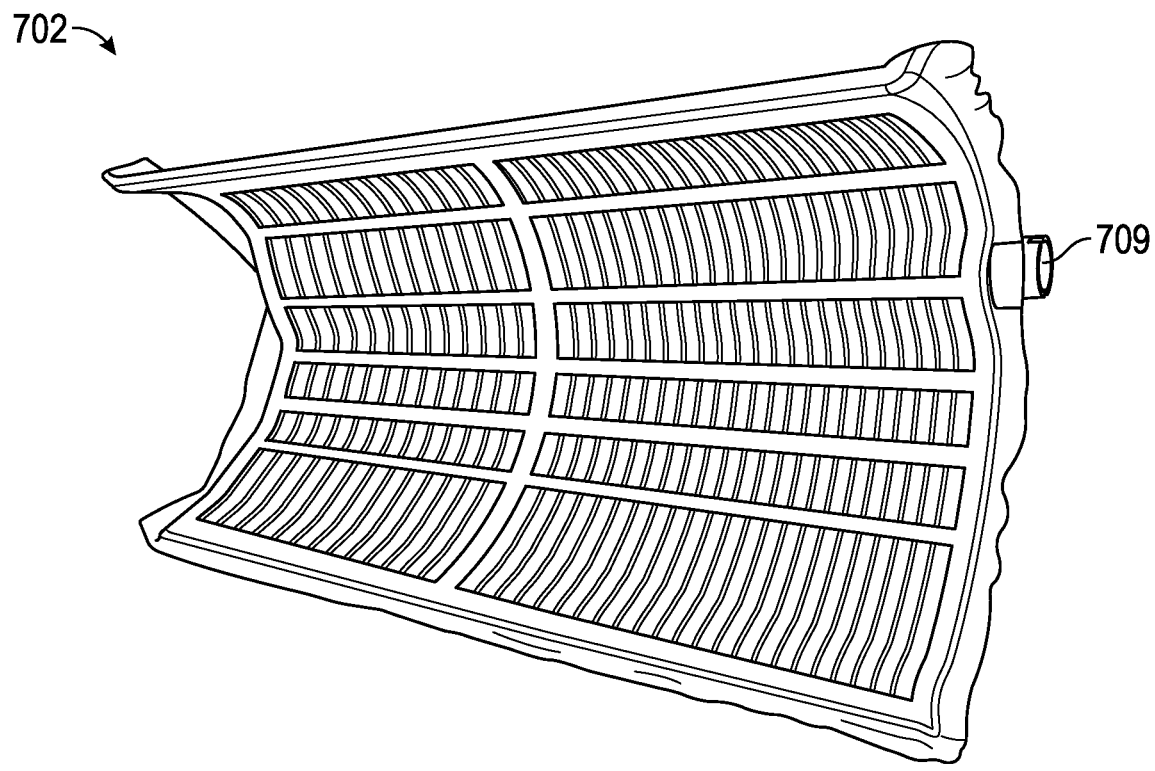
FIG. 14A shows a perspective view of a system filter according to the first illustrated embodiment.
Figure 14B:
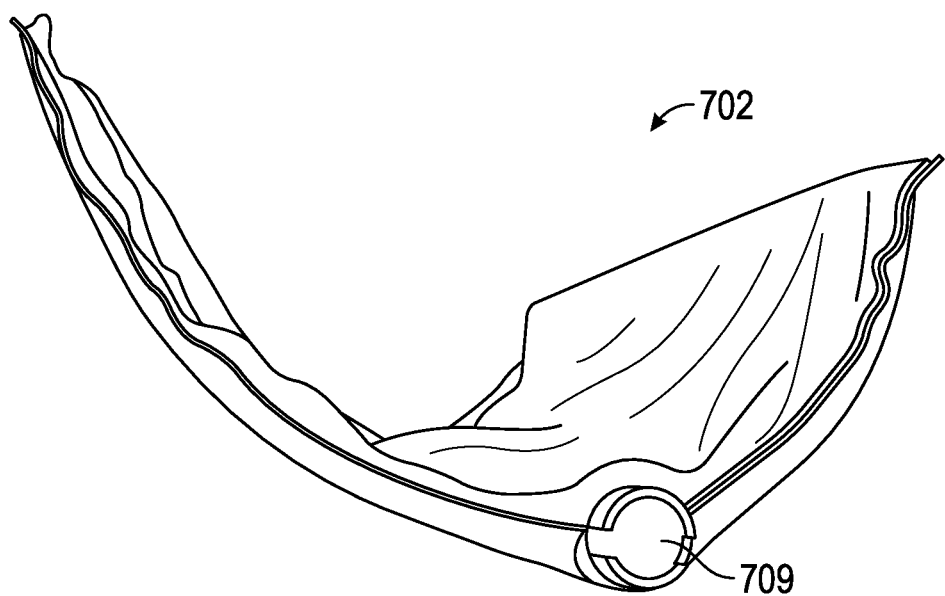
FIG. 14B shows a side view of the system filter according to the first illustrated embodiment.
Figure 15:
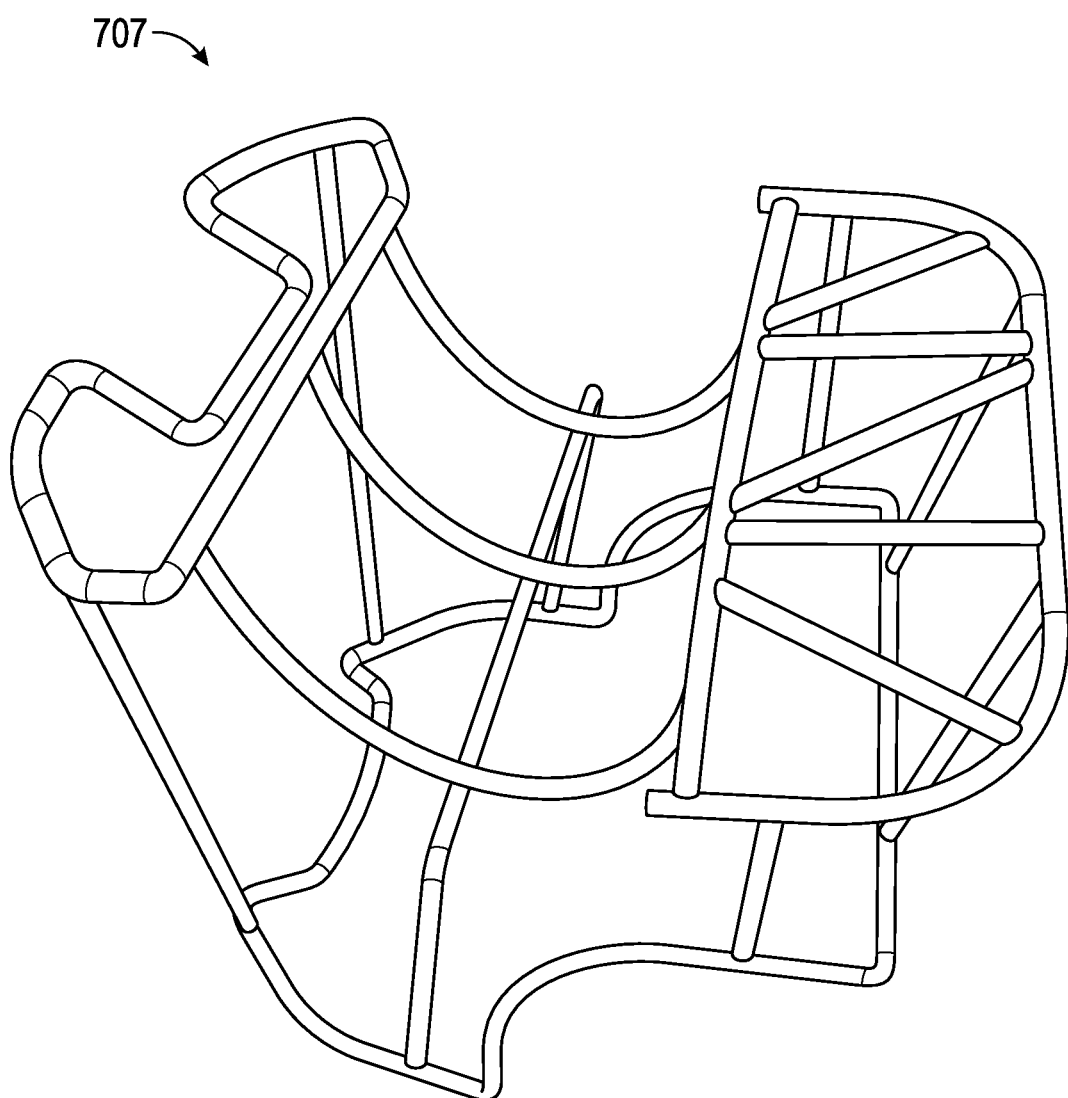
FIG. 15 shows perspective view of a support frame according to the first illustrated embodiment.
Figure 16:
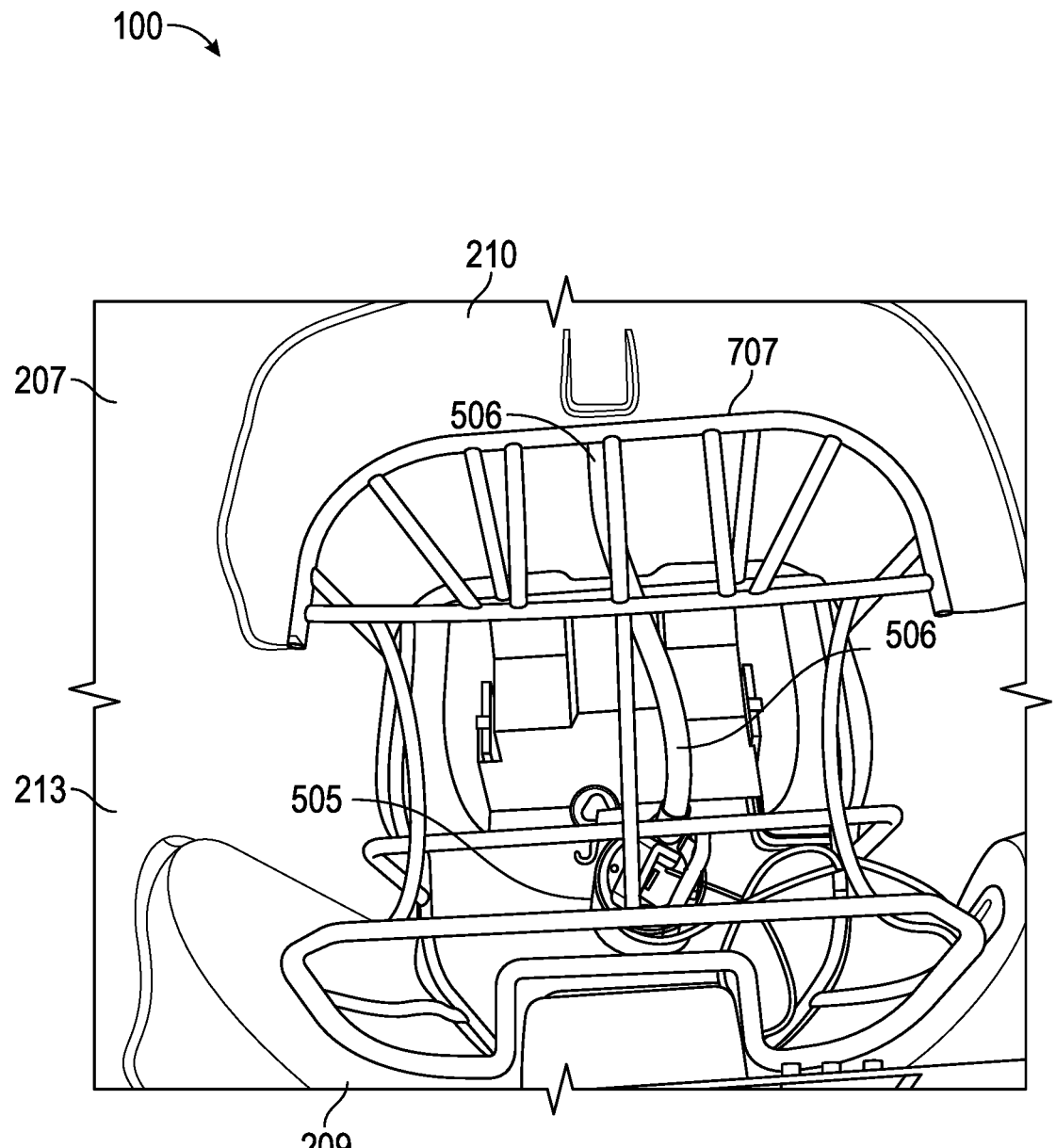
FIG. 16 shows a top view of a lower catch chamber with the support frame according to the first illustrated embodiment.
Figure 17:
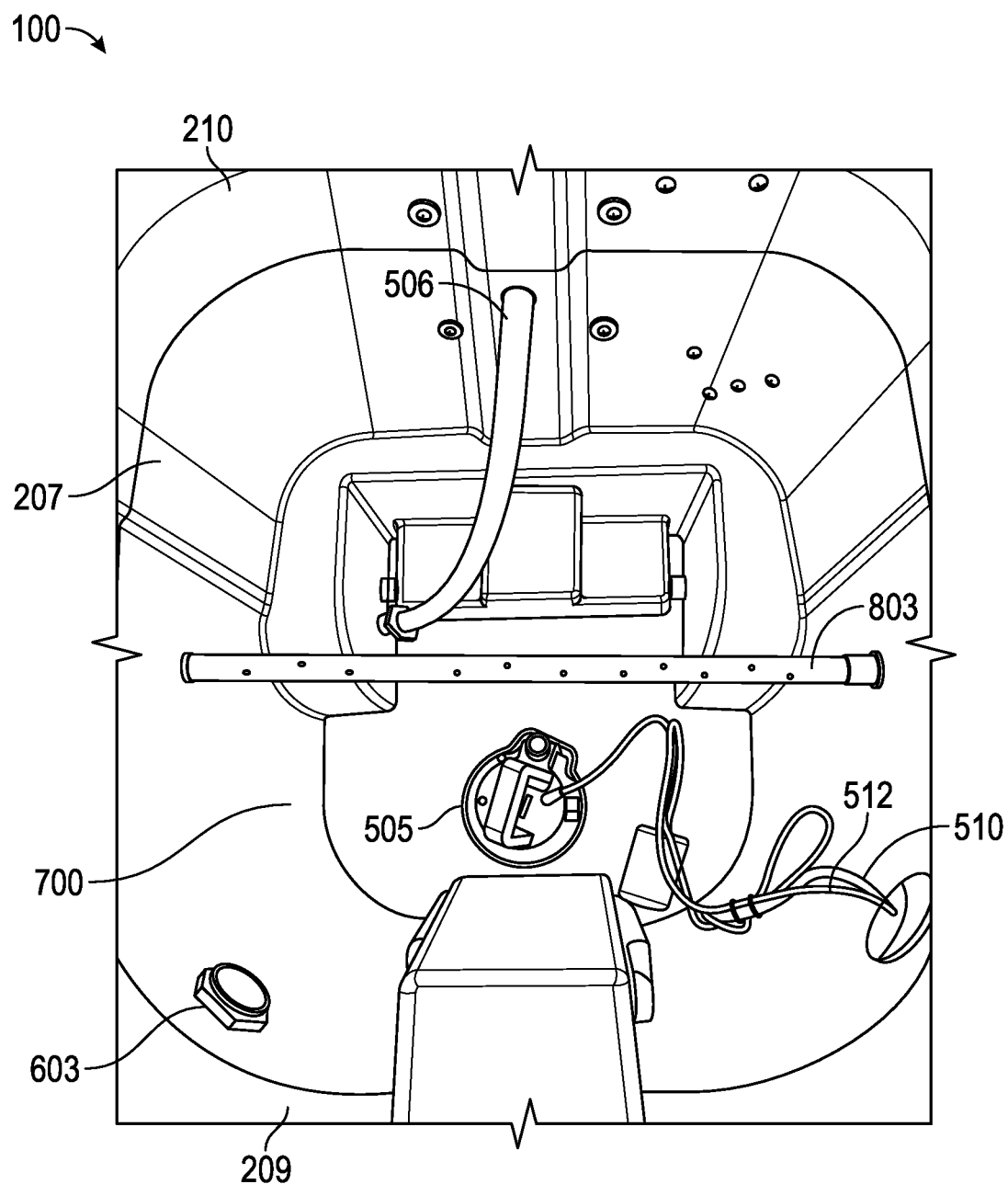
FIG. 17 shows an alternate top view of the lower catch chamber without the support frame according to the first illustrated embodiment.
Figure 18:
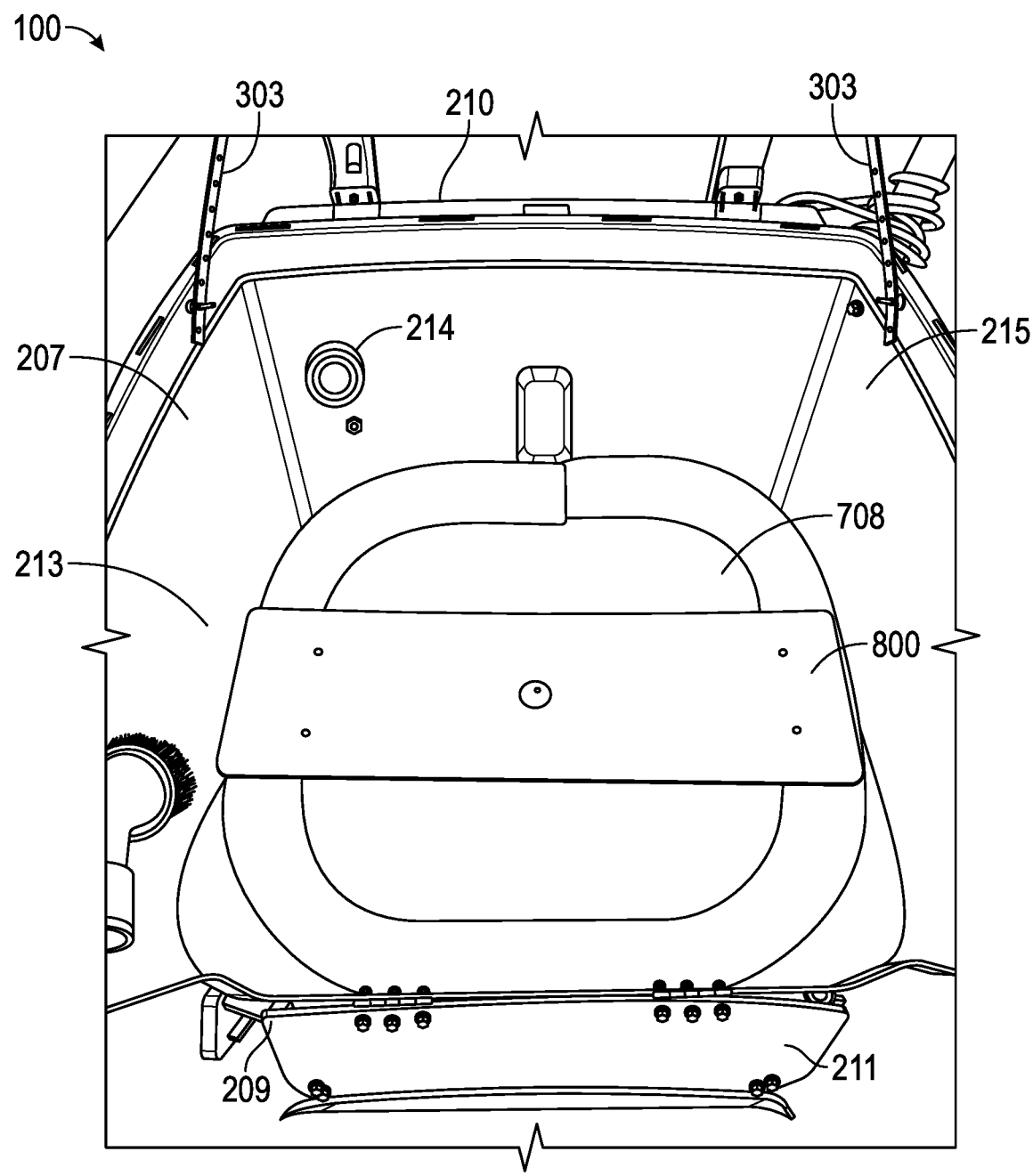
FIG. 18 shows a front view of a precursor filter according to the first illustrated embodiment.

The container body (201) comprises pressure differential ports disposed at both the upper wash compartment (213) and the lower catch chamber (700). The pressure differential port disposed at the upper wash compartment is a thrust port (214) configured to receive a pressure generator apparatus, such as a blower, for increasing the pressure within the upper wash compartment to expedite the filtering process which can be time consuming when particles as small as two microns are being filtered. Alternatively, or in addition to utilizing the thrust port for expediting the filter process, the container body further comprises a vacuum suction port (603) disposed at the lower catch chamber for receiving a pressure generator apparatus like a vacuum (601). The vacuum is configured to create a vacuum, or negative pressure, within the lower catch chamber to pull the filtered water through a system filter (702; FIG. 13). The vacuum suction port is disposed at an upper half of the lower catch chamber in order to avoid filtered water collected within the lower catch chamber to spill out. The container body further comprises an adjustable air vent (706) to alleviate workload on the vacuum when excessive dirt is present on the system filter. Extending through the container body at the lower catch chamber are electrical connectors (512) which are used to power a filtered water discharge pump (505; FIG. 17) disposed within the lower catch chamber.

The pool filter cleaning system (100) further comprises a detachable terminal filter (511) used an additional filtering step prior to discharging the filtered water back into the pool. The detachable terminal filter is configured to connect with the discharge hose (503). When the discharge hose is coupled to the discharge pump outlet (506), the filtered water can move from the lower catch chamber (700), out the discharge pump outlet, through the discharge hose, and ultimately through the detachable terminal pool prior to entering the pool. The detachable terminal filter is shown stored at the front side (209) of the container body (201) when not in use. In some embodiments the detachable terminal filter is configured to filter as small as 2-3 microns.

FIG. 10-18 show various views of the interior volume (215) of the pool filter cleaning system (100). The interior volume comprises the upper wash compartment (213) and the lower catch chamber (700), and a system filter (702) disposed between the upper wash compartment and the lower catch chamber. Disposed above the system filter is a cleaning platform (800) where the contaminated filters are placed upon when cleaning. The cleaning platform comprises an aperture (801) for receiving a post of the contaminated pool filters. The cleaning platform is held steady above the system filter by support posts (802) coupled to the inner surface (207) of the container body.

Coupled to the system filter (702) is one or more sealed surfaces (701). The one or more sealed surfaces are coupled to both the system filter and the inner surface (207) of the container body (201). At the junction of the one or more sealed surfaces and the inner surface is sealed surface edging (705) to ensure the only unsealed portion between the upper wash compartment and the lower catch chamber is the system filter. This ensures the pressure differential ports are effective for their design purpose. The one or more sealed surface comprises a first sealed surface (703) disposed at the back side (210) of the container body and a second sealed surface (704) disposed at the front side (209) of the container body. Both the first and second sealed surface comprises a downward slope to guide water toward the system filter wherein the system filter is disposed between the first sealed surface and the second sealed surface.

A vacuum (601) is storable within the upper wash compartment (213) during transport. The vacuum comprises a vacuum suction hose (602) and an electrical connector (512). The vacuum is utilized for multiple purposes. The vacuum is configured to remove debris disposed on top of the system filter (702) that remains after the contaminated water has been fully filtered. The vacuum is also configured to attach to the vacuum suction portion (603) for creating a negative pressure inside the lower catch chamber (700) to pull the contaminated water faster through the system filter. The vacuum can also be configured into a blower where the blower can attach to the thrust port (214) as an alternative or additional means of pressure differentiation. In some embodiments, only one of the pressure differential ports is used. In other embodiments, both are used concurrently. In yet other embodiments, the pool filter cleaning system comprises a plurality of thrust ports and/or a plurality of vacuum suction ports.

The system filter (702) comprises a filtering capability of particles at least 40 microns, and when used in conjunction with diatomaceous earth can filter particles as small as 2 microns. The system filter comprises a channel (709) extending through a center thereof. The channel is configured to slide over a perforated tube (803) disposed with the container body (201) above the lower catch chamber (700). The perforated tube is configured to provide support to the system filter as well as providing a means for internal flushing of the system filter. The perforated tube comprises an externally accessible outlet (804) which extends through the container body. The externally accessible outlet may comprise a cap.

Due to fine filtering capabilities of the system filter (702), water build-up on top of the system filter can be a common occurrence. For additional support, a support frame (707) can be utilized within the lower catch chamber (700) wherein the system filter and the one or more sealed surfaces (701) are disposed on top of the support frame. A filtered water discharge pump (505) is disposed under the support frame within the lower catch chamber. The filtered water discharge pump is configured to remove filtered water from the lower catch chamber for proper and eco-friendly disposal. In some situations, the filtered water discharge pump is utilized at the end the cleaning process where it is manually turned out. In other situations, filtered water discharge pump automatically turns on when filled with significant amounts of water. In such situations, a float switch (510) can be utilized to automatically turn on the filtered water discharge pump when the filtered water reaches a certain level. Filtered water reaching the system filter is not desirable due to the interference it would cause with the filtering process. In addition, if the filtered water reached a high enough level, it could spill out of the vacuum suction port (603). In some embodiments, the float switch can be configured to power the filtered water discharge pump when it reaches a level below the vacuum suction port, and can subsequently turn off when it reaches a lower predetermined level. When using the float switch for automatic powering of the filtered water discharge pump, the discharge hose (503) can be coupled to the discharge pump outlet (506) and positioned to where the discharged filtered water is desired. In some embodiments, the float switch is circumventable in order to allow for manual powering of the filtered water discharge pump. Said circumvent ability can be achieved with an electrical inline float switch connector, an electrical override, or other electrical and/or mechanical means as can be appreciated by one having skill in the art.

The pool filter cleaning system (100) further comprises a precursor filter (708) disposed above the system filter (702) and below the cleaning platform (800). The precursor filter is removably engaged with the system filter and is configured to initially receive large particles from the contaminated pool filters in order for the system filter to focus on smaller particles, thereby improving filtering efficiency. The precursor filter can be inserted onto the system filter when a contaminated pool filter comprises an excessive amount of debris. Contaminated water will flow through the precursor filter where a majority of the debris will be caught. The water still containing smaller contaminants will flow through the precursor filter and into the system filter for a more acute filtering.

| Feature List | |
|---|---|
| pool filter cleaning system | (100) |
| container | (200) |
| container body | (201) |
| upper rim | (202) |
| front edge | (203) |
| rear edge | (204) |
| first side edge | (205) |
| second side edge | (206) |
| inner surface | (207) |
| outer surface | (208) |
| front side | (209) |
| back side | (210) |
| movable front portion | (211) |
| hinge | (212) |
| upper wash compartment | (213) |
| thrust port | (214) |
| interior volume | (215) |
| container lid | (300) |
| top side | (301) |
| bottom side | (302) |
| lid support member | (303) |
| deployable shield | (400) |
| upper edge | (401) |
| plurality of shield portions | (402) |
| freshwater hose | (501) |
| first reel | (502) |
| discharge hose | (503) |
| second reel | (504) |
| filtered water discharge pump | (505) |
| discharge pump outlet | (506) |
| transfer pump | (507) |
| transfer pump inlet hose | (508) |
| transfer pump discharge hose | (509) |
| float switch | (510) |
| detachable terminal filter | (511) |
| electrical connector | (512) |
| vacuum | (601) |
| vacuum suction hose | (602) |
| vacuum suction port | (603) |
| lower catch chamber | (700) |
| sealed surface | (701) |
| system filter | (702) |
| first sealed surface | (703) |
| second sealed surface | (704) |
| sealed surface edging | (705) |
| adjustable air vent | (706) |
| support frame | (707) |
| precursor filter | (708) |
| channel | (709) |
| cleaning platform | (800) |
| aperture | (801) |
| plurality of support posts | (802) |
| perforated tube | (803) |
| externally accessible outlet | (804) |
| wheels | (901) |
| umbrella holder | (902) |

What is claimed is:

1. A pool filter cleaning system, comprising
a container body having an inner surface and an outer surface opposite the inner surface, the inner surface forming an interior volume, the interior volume divided into an upper wash compartment and a lower catch chamber wherein the upper wash compartment is disposed above the lower catch chamber, the container body further comprising a front side, a back side opposite the front side, a plurality of laterals sides, and an upper rim comprising portions of the front side, back side, and the plurality of lateral sides;
a container lid hingedly coupled to the container body at the back side, the container lid configured to engage with the upper rim;
one or more lid support members each coupled to both the container body and the container lid, the one or more lid support members configured to maintain the container lid in an upright and open position;
a deployable shield movably coupled to the upper rim at the back side and at least one of the plurality of lateral sides, the deployable shield comprising an upper edge that is positioned at a higher elevation than the upper rim;
a system filter disposed within the interior volume of the container body wherein the system filter is disposed between the upper wash compartment and the lower catch chamber;
one or more sealed surfaces coupled to the system filter and the inner surface of the container body, at least one of the one or more sealed surfaces comprising a downward tilt for directing water toward the system filter;
a cleaning platform disposed above the system filter, the cleaning platform supported by one or more support posts, the one or more support posts each coupled to the inner surface of the container body wherein the cleaning platform is removably coupled to the one or more support posts;
one or more pressure differential ports disposed on the container body, the one or more pressure differential ports configured to receive a corresponding pressure generator apparatus for creating a pressure differential between the upper wash compartment and the lower catch chamber;
a filtered water discharge pump disposed within the lower catch chamber, the filtered water discharge pump coupled to a discharge pump outlet wherein the discharge pump outlet extends through the container body at the lower catch chamber;
a transfer pump coupled to the outer surface of the container body, the transfer pump comprising an inlet hose and an outlet hose; and
wheels coupled to the container body.

2. The system of claim 1, the container body further comprising a movable front portion disposed at the front side of the container body, the movable front portion comprising at least a portion of the upper rim, wherein the movable front portion is movably coupled to the container body such that the upper rim at the front side is configured to decouple from the container body.

3. The system of claim 1, wherein the system filter further comprises diatomaceous earth disposed on the system filter, the system filter with the diatomaceous earth having a filtering capability of at least 5 microns.

4. The system of claim 1, wherein at least one of the one or more pressure differential ports comprises a vacuum suction port disposed on the container body at the lower catch chamber.

5. The system of claim 1, wherein at least one of the one or more pressure differential ports comprises a thrust port disposed on the container body at the upper wash compartment.

6. The system of claim 1, the container body further comprising an adjustable air vent disposed on the container body at the lower catch chamber.

7. The system of claim 1, further comprising a float switch electrically coupled to the filtered water discharge pump for automatic powering of the filtered water discharge pump when water disposed in the lower catch chamber is above a corresponding float level associated with the float switch.

8. The system of claim 1, the system filter further comprising a channel extending through a middle portion thereof.

9. The system of claim 8, the system filter further comprising a perforated tube extending through the channel, the perforated tube having an externally accessible outlet extending through the container body for flushing the system filter.

10. The system of claim 1, further comprising a precursor filter disposed between the system filter and the cleaning platform.

11. A pool filter cleaning system, comprising
a container body having an inner surface and an outer surface opposite the inner surface, the inner surface forming an interior volume, the interior volume divided into an upper wash compartment and a lower catch chamber wherein the upper wash compartment is disposed above the lower catch chamber, the container body further comprising a front side, a back side opposite the front side, a plurality of laterals sides, and an upper rim comprising portions of the front side, back side, and the plurality of lateral sides;
a system filter disposed within the interior volume of the container body wherein the system filter is disposed between the upper wash compartment and the lower catch chamber;
one or more sealed surfaces coupled to the system filter and the inner surface of the container body, at least one of the one or more sealed surfaces comprising a downward tilt for directing water toward the system filter;
a cleaning platform disposed above the system filter, the cleaning platform supported by one or more support posts, the one or more support posts each coupled to the inner surface of the container body wherein the cleaning platform is removably coupled to the one or more support posts;
one or more pressure differential ports disposed on the container body, the one or more pressure differential ports configured to receive a corresponding pressure generator apparatus for creating a pressure differential between the upper wash compartment and the lower catch chamber;
a filtered water discharge pump disposed within the lower catch chamber, the filtered water discharge pump coupled to a discharge pump outlet wherein the discharge pump outlet extends through the container body at the lower catch chamber; and
wheels coupled to the container body.

12. The system of claim 11, further comprising a transfer pump coupled to the outer surface of the container body, the transfer pump comprising an inlet hose and an outlet hose.

13. The system of claim 11, further comprising a deployable shield movably coupled to the upper rim at the back side and at least one of the plurality of lateral sides, the deployable shield comprising an upper edge that is positioned at a higher elevation than the upper rim.

14. The system of claim 11, wherein at least one of the one or more pressure differential ports comprises a vacuum suction port disposed on the container body at the lower catch chamber.

15. The system of claim 11, wherein at least one of the one or more pressure differential ports comprises a thrust port disposed on the container body at the upper wash compartment.

16. The system of claim 11, wherein the system filter further comprises diatomaceous earth disposed on the system filter, the system filter with the diatomaceous earth having a filtering capability of at least 5 microns.

17. The system of claim 11, the container body further comprising a movable front portion disposed at the front side of the container body, the movable front portion comprising at least a portion of the upper rim, wherein the movable front portion is movably coupled to the container body such that the upper rim at the front side is configured to decouple from the container body.

* * * * *